US008577023B2

(12) United States Patent
Shirai et al.

(10) Patent No.: US 8,577,023 B2
(45) Date of Patent: Nov. 5, 2013

(54) ENCRYPTION PROCESSING METHOD, APPARATUS, AND COMPUTER PROGRAM UTILIZING DIFFERENT TYPES OF S-BOXES

(75) Inventors: Taizo Shirai, Kanagawa (JP); Kyoji Shibutani, Kanagawa (JP); Toru Akishita, Tokyo (JP); Shiho Moriai, Kanagawa (JP)

(73) Assignee: Sony Corporation, Tokyo (JP)

( * ) Notice: Subject to any disclaimer, the term of this patent is extended or adjusted under 35 U.S.C. 154(b) by 944 days.

(21) Appl. No.: 12/439,464

(22) PCT Filed: Aug. 29, 2007

(86) PCT No.: PCT/JP2007/066730
§ 371 (c)(1),
(2), (4) Date: Dec. 2, 2009

(87) PCT Pub. No.: WO2008/026622
PCT Pub. Date: Mar. 6, 2008

(65) Prior Publication Data
US 2010/0104093 A1    Apr. 29, 2010

(30) Foreign Application Priority Data

Sep. 1, 2006  (JP) ................................ 2006-238225

(51) Int. Cl.
*H04L 9/28* (2006.01)
(52) U.S. Cl.
USPC ......................................................... 380/28
(58) Field of Classification Search
None
See application file for complete search history.

(56) References Cited

U.S. PATENT DOCUMENTS

| 5,003,597 A | 3/1991 | Merkle |
| 5,745,577 A * | 4/1998 | Leech ............................ 380/28 |
| 2001/0038693 A1* | 11/2001 | Luyster .......................... 380/37 |

FOREIGN PATENT DOCUMENTS

WO    WO 01/67425    9/2001

OTHER PUBLICATIONS

J. Gargiulo, "S-Box Modifications and Their Effect in DES-like Encryption Systems," SANS Institute InfoSec Reading Room, Jul. 25, 2002.*
K. Aoki, et al. "Camellia: A 128-Bit Block Cipher Suitable for Multiple Platforms—Design and Analysis," 2000, Retrieved May 17, 2012,  Online:  http://citeseerx.ist.psu.edu/viewdoc/summary?doi=10.1.1.25.9586.*
V. Rijmen, et al. "The Cipher SHARK," Springer-Verlag, 1996, Fast Software Encryption, 3rd International Workshop, pp. 99-112.*
C. Adams, et al. "The Structured Design of Cryptographically Good S-Boxes," Journal of Cryptology, vol. 3, No. 1, 1990 pp. 27-41.*

(Continued)

*Primary Examiner* — Jung Kim
*Assistant Examiner* — Robert Leung
(74) *Attorney, Agent, or Firm* — Finnegan, Henderson, Farabow, Garrett & Dunner, L.L.P.

(57) ABSTRACT

A common-key blockcipher processing configuration with enhanced immunity against attacks such as saturation attacks and algebraic attacks (XSL attacks) is realized. In an encryption processing apparatus that performs common-key blockcipher processing, S-boxes serving as non-linear transformation processing parts set in round-function executing parts are configured using at least two different types of S-boxes. With this configuration, the immunity against saturation attacks can be enhanced. Also, types of S-boxes present a mixture of different types. With this configuration, the immunity against algebraic attacks (XSL attacks) can be enhanced, thereby realizing a highly secure encryption processing apparatus.

32 Claims, 19 Drawing Sheets

(56) References Cited

OTHER PUBLICATIONS

R. Anderson, et al. "Serpent: A Proposal for the Advanced Encryption Standard," Primitive submitted to AES, 1998, Retrieved May 17, 2012, Online: http://citeseerx.ist.psu.edu/viewdoc/summary?doi=10.1.1.35.5585.*

C. Adams, et al., "Good S-Boxes Are Easy to Find," Advances in Cryptology—CRYPTO '89, LNCS 435, pp. 612-615, 1990.*

R. Merkle, "Fast Software Encryption Functions", Lecture Notes in Computer Science, vol. 537., pp. 476-504 (1991).

J. Seberry, et al., "A Block Cipher Method using Combinations of Different Methods Under the Control of the User Kay", Lecture Notesin Computer Science, vol. 718, pp. 531-534 (1991).

L. Brown, et al., "LOKI—A Cryptographic Primitive for Authentication and Secrecy Applications", Lecture Notes in Computer Science, vol. 453, pp. 229-236 (1991).

The 128-bit Blockcipher CLEFIA Design Rationale, Revision 1.0[online].Jun. 1, 2007[retrieved on Sep. 13, 2007] Retrieved from the Internet: http://www/sony.co.jp/Products/clefia/technical/index.html.

Y. Zheng, et al., "On the Construction of Block Ciphers Provably Secure and Not Relying on Any Unproved Hypotheses", CRYPTO, pp. 461-480 (1989).

K. Nyberg, "Generalized Feistel Networks", ASIACRYPT'96, SpringerVerlag, pp. 91-104 (1996).

Notification of Reasons for Refusal with English language translation issued by Japanese Patent Office on Dec. 13, 2011 in corresponding Japanese application No. 2006-238225.

* cited by examiner

ENCRYPTION PROCESSING METHOD, APPARATUS, AND COMPUTER PROGRAM UTILIZING DIFFERENT TYPES OF S-BOXES

TECHNICAL FIELD

The present invention relates to encryption processing apparatuses, encryption processing methods, and computer programs. More particularly, the present invention relates to an encryption processing apparatus, an encryption processing method, and a computer program for performing common-key blockcipher processing.

BACKGROUND ART

As network communication and electronic commerce have been developed in the recent years, the ensuring of security in communication has been an important issue. One method of ensuring security is cryptography technology. Currently, communication has been actually done using various ciphers.

For example, a system has been put to practical use in which an encryption processing module is embedded in a small device, such as an IC card, and data transmission/reception is performed between the IC card and a reader/writer serving as a data-reading/writing device, thereby implementing authentication processing or encryption/decryption of transmission/reception data.

Various encryption processing algorithms are available. These encryption algorithms can be largely classified into public-key cryptography in which an encryption key and a decryption key are set as different keys, such as a public key and a secret key, and common-key cryptography in which an encryption key and a decryption key are set as a common key.

There are various algorithms for common-key cryptography. One algorithm involves generating a plurality of keys on the basis of a common key and repeatedly performing data transformation processing in increments of a block (e.g., 64 bits or 128 bits) using the generated keys. A typical algorithm applying such a key generation scheme and data transformation processing is a common-key blockcipher.

As typical common-key blockcipher algorithms, for example, a DES (Data Encryption Standard) algorithm, which was a standard cipher for the United States in the past, and an AES (Advanced Encryption Standard) algorithm, which is a standard cipher for the United States at present, are known.

These common-key blockcipher algorithms are mainly constituted of an encryption processing part including round-function executing parts that repeatedly perform transformation of input data, and a key scheduling part that generates round keys applied to respective rounds of the round-function parts. The key scheduling part generates an expanded key on the basis of a master key (main key) which is a secret key by increasing the number of bits, and, on the basis of the generated expanded key, generates round keys (sub-keys) to be applied to the respective round-function parts of the encryption processing part.

As a specific structure for executing such an algorithm, a structure that repeatedly executes a round function including a linear transformation part and a non-linear transformation part is known. For example, a Feistel structure is one typical structure. A Feistel structure has a structure that transforms plaintext into ciphertext by simply repeating a round function (F-function) serving as a data transformation function. In a round function (F-function), linear transformation processing and non-linear transformation processing are executed. Note that, as documents describing encryption processing applying a Feistel structure, there are, for example, Non-Patent Document 1 and Non-Patent Document 2.

However, the common-key blockcipher has a problem of the leakage of keys due to cryptanalysis. The fact that the keys can be analyzed easily by cryptanalysis means that the cipher has low security, leading to a serious problem in applications.

Non-Patent Document 1: K. Nyberg, "Generalized Feistel networks", ASIACRYPT '96, Springer Verlag, 1996, pp. 91-104.

Non-Patent Document 2: Yuliang Zheng, Tsutomu Matsumoto, Hideki Imai On the Construction of Block Ciphers Provably Secure and Not Relying on Any Unproved Hypotheses. CRYPTO 1989: 461-480

DISCLOSURE OF INVENTION

Technical Problem

The present invention has been made in view of the foregoing problems, and it is an object of the present invention to provide an encryption processing apparatus, an encryption processing method, and a computer program for increasing the difficulty of cryptanalysis and implementing a highly secure common-key blockcipher algorithm.

Technical Solution

A first aspect of the present invention resides in:

an encryption processing apparatus that performs common-key blockcipher processing, characterized by including:

an encryption processing part that performs data transformation processing in which a round function is repeated for a plurality of rounds, wherein the encryption processing part is configured to perform non-linear transformation processing applying S-boxes in processing of executing round functions in the respective rounds, and wherein the encryption processing part is configured to perform processing using at least two different types of S-boxes as the S-boxes applied in the non-linear transformation processing.

Further, in an embodiment of the encryption processing apparatus of the present invention, it is characterized in that the encryption processing part is configured to perform encryption processing applying a Feistel structure in which the number of data lines (the number of divisions) is two, or a generalized Feistel structure in which the number of data lines (the number of divisions) is two or greater. The encryption processing part is configured to perform encryption processing applying F-functions serving as round-function executing parts, which have the same input data line and output data line and which are vertically adjacent to one another, in which non-linear transformation processing performed in the F-functions is set as different S-boxes that perform different types of non-linear transformation processing.

Further, in an embodiment of the encryption processing apparatus of the present invention, it is characterized in that each of the F-functions serving as the round-function executing parts includes a plurality of S-boxes that perform non-linear transformation processing of respective pieces of data into which data to be processed is divided. The plurality of S-boxes include at least two different types of S-boxes.

Further, in an embodiment of the encryption processing apparatus of the present invention, it is characterized in that each of the F-functions serving as the round-function executing parts includes a plurality of S-boxes that perform non-linear transformation processing of respective pieces of data into which data to be processed is divided. Non-linear transformation processing performed in increments of a piece of data in the F-functions serving as the round-function executing parts, which have the same input data line and output data line and which are vertically adjacent to one another, is configured to be set as different S-boxes that perform different types of non-linear transformation processing.

Further, in an embodiment of the encryption processing apparatus of the present invention, it is characterized in that the types of the S-boxes and the number of the individual S-boxes included in each of the F-functions serving as the round-function executing parts have the same setting among the individual F-functions.

Further, in an embodiment of the encryption processing apparatus of the present invention, it is characterized in that the encryption processing part is configured to use, as different s-bit-input/output S-boxes to be applied in the non-linear transformation processing, (1) type 1: an S-box using an inverse map: $Y=X^{-1}$ or a power function $Y=X^q$ over an extension field $GF(2^s)$;

(2) type 2: an S-box generated by combining a plurality of small t-bit S-boxes, where $t<s$; and (3) type 3: an S-box selected at random, at least two different types of S-boxes from among the above-described three types of S-boxes (1) to (3).

Further, in an embodiment of the encryption processing apparatus of the present invention, it is characterized in that the encryption processing part has, regarding the S-boxes applied to executing the round functions, (a) a configuration in which some of the S-boxes are of type 1, and the remaining S-boxes are of type 2;

(b) a configuration in which some of the S-boxes are of type 1, and the remaining S-boxes are of type 3;

(c) a configuration in which some of the S-boxes are of type 2, and the remaining S-boxes are of type 3; and (d) a configuration in which some of the S-boxes are of type 1, some of the remaining S-boxes are of type 2, and the rest of the S-boxes are of type 3, any one of the above-described configurations (a) to (d).

Further, in an embodiment of the encryption processing apparatus of the present invention, it is characterized in that the encryption processing part includes, in round-function executing parts, a plurality of S-boxes that perform non-linear transformation processing of respective pieces of data into which data to be processed is divided. The encryption processing part is configured to perform processing using S-boxes of one type in one round and S-boxes of different types on a round-by-round basis.

Further, in an embodiment of the encryption processing apparatus of the present invention, it is characterized in that the encryption processing part includes, in round-function executing parts, a plurality of S-boxes that perform non-linear transformation processing of respective pieces of data into which data to be processed is divided. The encryption processing part is configured to use different types of S-boxes in one round.

Further, in an embodiment of the encryption processing apparatus of the present invention, it is characterized in that the types of the S-boxes and the number of the individual S-boxes included in each of the round-function executing parts have the same setting among the individual F-functions.

Further, in an embodiment of the encryption processing apparatus of the present invention, it is characterized in that the encryption processing part is configured to perform encryption processing in accordance with common-key cryptography.

Further, in an embodiment of the encryption processing apparatus of the present invention, it is characterized in that the encryption processing part is configured to perform encryption processing in accordance with common-key blockcipher cryptography.

Further, a second aspect of the present invention resides in:

an encryption processing method of performing common-key blockcipher processing in an encryption processing apparatus, characterized by including:

an encryption processing step of performing, in an encryption processing part, data transformation processing in which a round function is repeated for a plurality of rounds, wherein the encryption processing step is a step of performing non-linear transformation processing applying S-boxes in processing of executing round functions in the respective rounds, and performing processing using at least two different types of S-boxes as the S-boxes applied in the non-linear transformation processing.

Further, in an embodiment of the encryption processing method of the present invention, it is characterized in that the encryption processing step performs encryption processing in accordance with common-key cryptography or common-key blockcipher cryptography.

Further, a third aspect of the present invention resides in:

a computer program that causes an encryption processing apparatus to perform common-key blockcipher processing, characterized by including:

an encryption processing step of causing an encryption processing part to perform data transformation processing in which a round function is repeated for a plurality of rounds, wherein the encryption processing step is a step of causing non-linear transformation processing applying S-boxes to be performed in processing of executing round functions in the respective rounds, and causing processing using at least two different types of S-boxes as the S-boxes applied in the non-linear transformation processing to be performed.

Further, in an embodiment of the computer program of the present invention, it is characterized in that the encryption processing step is a step of causing encryption processing to be performed in accordance with common-key cryptography or common-key blockcipher cryptography.

Note that a computer program of the present invention is a computer program that can be provided through storage media, such as recording media including a CD, an FD, and an MO, or communication media, such as a network, which can provide the program in a computer-readable format to, for example, a computer system capable of executing various program codes. By providing such a program in a computer-readable format, processing corresponding to the program can be performed on the computer system.

Further objects, features, and advantageous effects of the present invention will become apparent from the following detailed description of embodiments of the present invention and drawings attached thereto. Note that the system in the present specification refers to a logical assembly of a plurality of apparatuses and is not limited to an assembly in which apparatuses having individual configurations are contained in a single housing.

Advantageous Effects

According to the configuration of an embodiment of the present invention, in an encryption processing apparatus that performs common-key blockcipher processing, it is configured to employ at least two different types of S-boxes as S-boxes serving as a non-linear transformation processing part set in a round-function executing part. With this configuration, the immunity against saturation attacks can be enhanced. Also, according to the configuration of an embodiment of the present invention in which types of S boxes present a mixture of different types, the immunity against algebraic attacks (XSL attacks) can be enhanced, thereby realizing a highly secure encryption processing apparatus.

BEST MODES FOR CARRYING OUT THE INVENTION

An encryption processing apparatus, an encryption processing method, and a computer program of the present invention will now herein be described in detail below. The description will be given in accordance with the following sections:

1. Outline of common-key blockcipher
2. Configuration in which immunity is enhanced by arranging a plurality of different S-boxes
(2A) Configuration in which immunity against saturation attacks is enhanced by arranging two or more different types of S-boxes in Feistel or generalized Feistel-type cipher using S-boxes
(2B) Configuration in which immunity against algebraic attacks (XSL attacks) is enhanced by mixing two or more different types of S-boxes in blockcipher using S-boxes
(2C) Configuration in which the above-described (2A) and (2B) are simultaneously realized in Feistel cipher or generalized Feistel-type cipher using S-boxes
3. Configuration example of encryption processing apparatus

[1. Outline of Common-Key Blockcipher]

First, the outline of common-key blockciphers which can be applied to the present invention will be described. In this specification, common-key blockciphers (hereinafter called blockciphers) are those defined below.

A blockcipher takes plaintext P and a key K as inputs and outputs ciphertext C. The bit length of plaintext and ciphertext is referred to as a block size, which is denoted herein by n. Although n can take any integer, generally, n is a predetermined value for each blockcipher algorithm. A blockcipher whose block length is n may be referred to as an n-bit blockcipher.

The bit length of a key is denoted by k. The key can take any integer. A common-key blockcipher algorithm is to handle one or plural key sizes. For example, one blockcipher algorithm A has block size n=128 and may be configured to handle various key sizes, i.e., bit length k=128, k=192, or k=256.

Individual bit sizes of plaintext [P], ciphertext (C), and a key [K] are indicated as follows:

plaintext P: n bits
ciphertext C: n bits
key K: k bits

Figure 1:
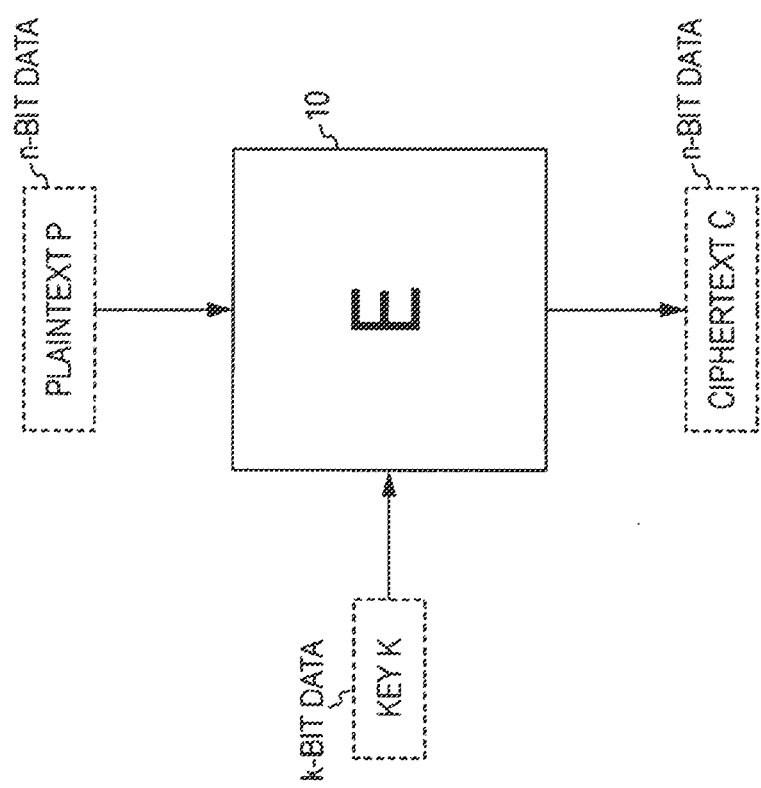
FIG. 1 is a diagram showing the basic configuration of a common-key blockcipher algorithm.

An n-bit common-key blockcipher algorithm E capable of handling a k-bit key length is illustrated in FIG. 1. As illustrated in FIG. 1, a common-key blockcipher processing part E10 takes n-bit plaintext P and a k-bit key K as inputs, executes a predetermined encryption algorithm, and outputs n-bit ciphertext C. Note that, although encryption processing of generating ciphertext from plaintext is illustrated in FIG. 1, decryption processing of generating plaintext from ciphertext generally employs an inverse function of E10. Note that, depending on the structure of the encryption processing part E10, a similar common-key blockcipher processing part E10 is also applicable to decryption processing, and decryption processing is made possible by changing the sequence such as the order of inputting keys or the like.

Figure 2:
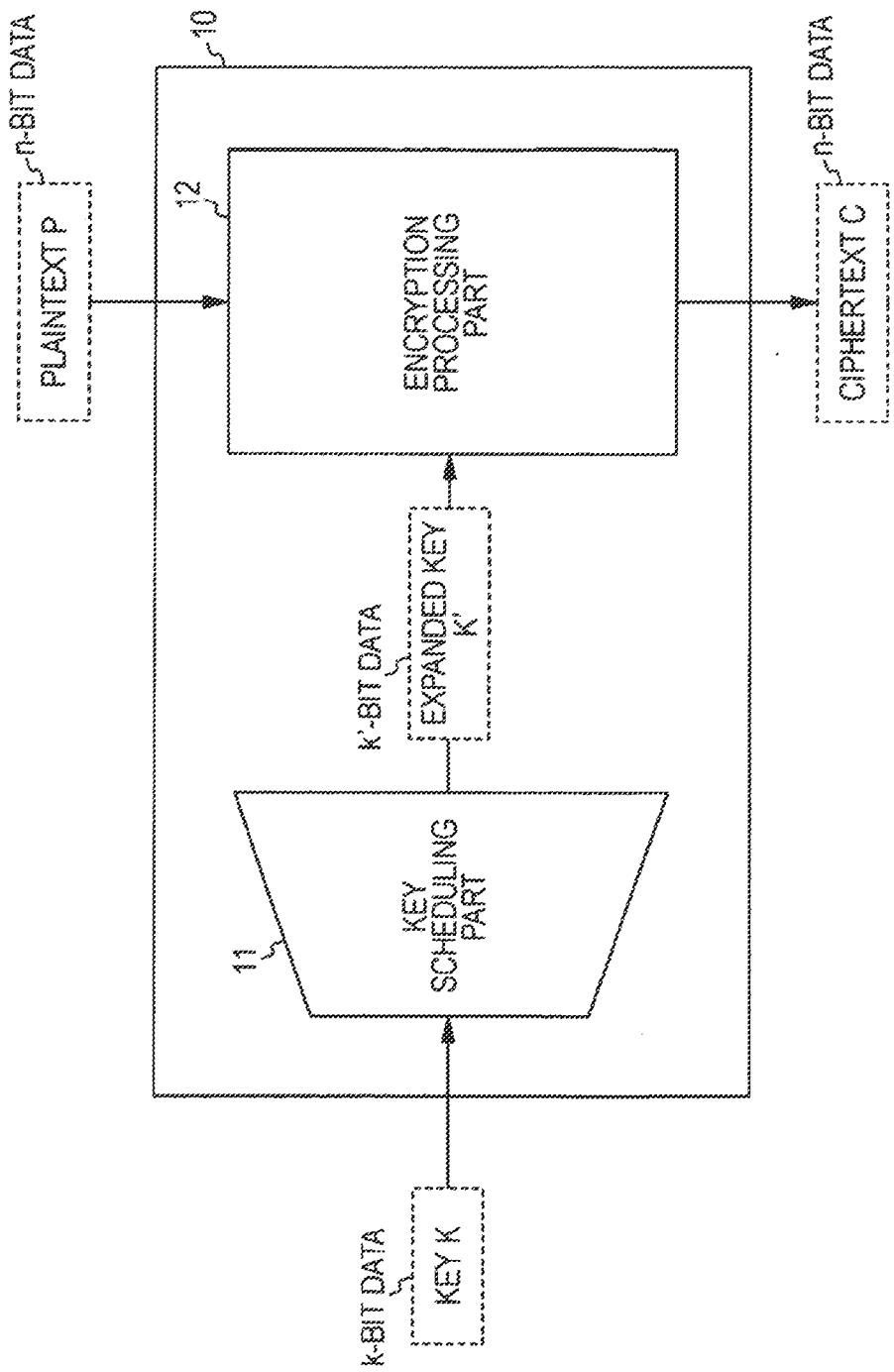
FIG. 2 is a diagram describing the internal configuration of a common-key blockcipher processing part E10 illustrated in FIG. 1.

With reference to FIG. 2, the internal configuration of the common-key blockcipher processing part E10 illustrated in FIG. 1 will be described. A blockcipher can be regarded as having two separate parts. One part is a key scheduling part 11 which takes a key K as an input, expands the bit length of the input key K by performing predetermined steps, and outputs an expanded key K' (bit length k'), and the other part is an encryption processing part 12 which performs data transformation for generating ciphertext C by receiving the expanded key K' input from the key scheduling part 11, taking plaintext P as an input, and performing encryption processing applying the expanded key K'. Note that, as has been described above, depending on the structure of the encryption processing part 12, the encryption processing part 12 is applicable to data decryption processing of transforming ciphertext back to plaintext.

Figure 3:
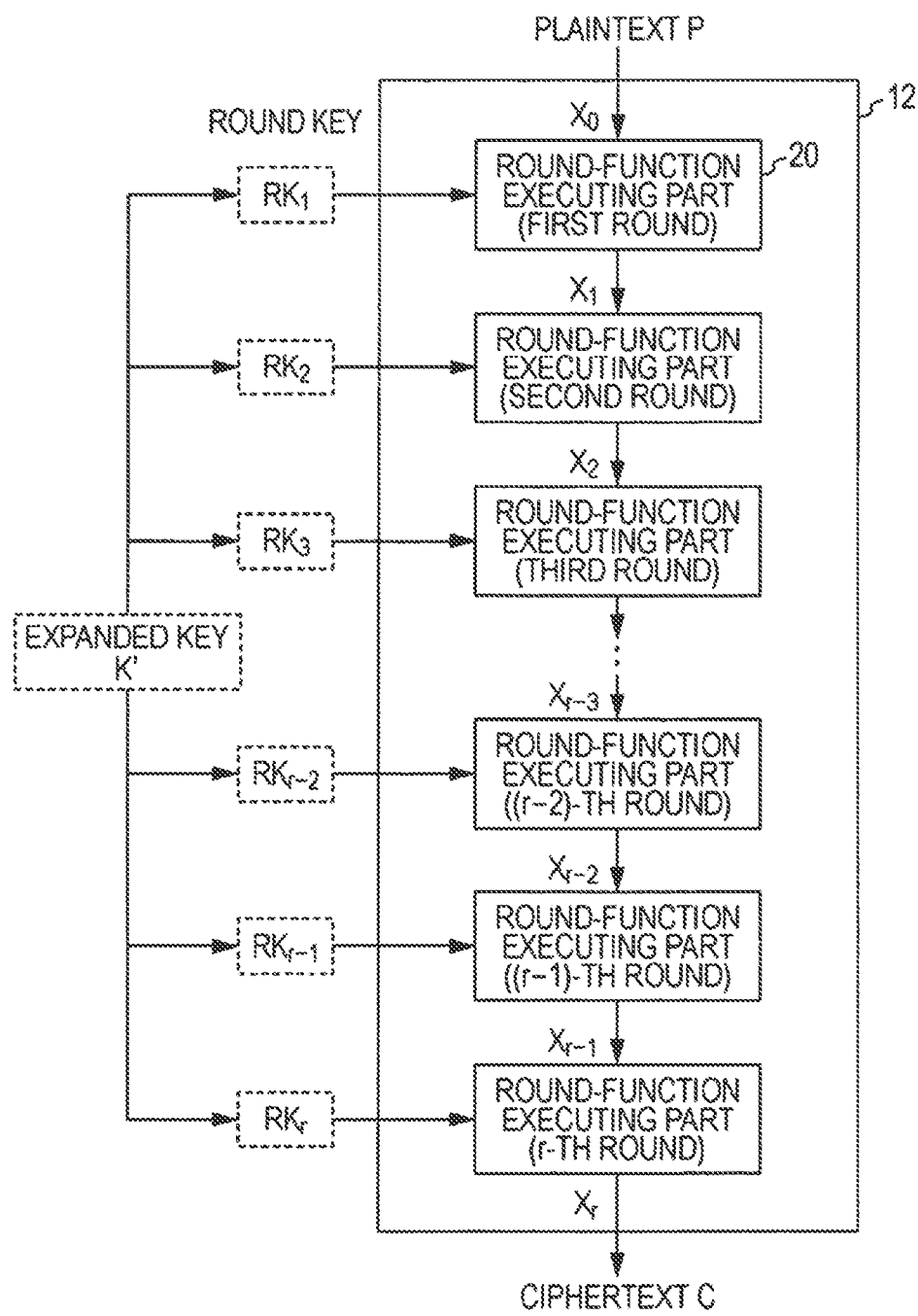
FIG. 3 is a diagram describing the detailed configuration of an encryption processing part 12 illustrated in FIG. 2.

Next, with reference to FIG. 3, the detailed configuration of the encryption processing part 12 illustrated in FIG. 2 will be described. As illustrated in FIG. 3, the encryption processing part 12 is configured to repeatedly perform data transformation applying round-function executing parts 20. That is, the encryption processing part 12 can be separated into units for processing that are the round-function executing parts 20. Each round-function executing part 20 takes two pieces of data as inputs, an output $X_i$ of the round-function executing part at the previous stage and a round key $PK_i$ generated on the basis of the expanded key, performs data transformation processing therein, and outputs output data $X_{i+1}$ to the next round-function executing part. Note that an input to the first round is plaintext or initialization processing data for plaintext. Also, an output from the last round is ciphertext.

In the example illustrated in FIG. 3, the encryption processing part 12 has r round-function executing parts 20 and is configured to repeatedly perform data transformation r times in the round-function executing parts to generate ciphertext. The number of times a round function is executed is referred to as the number of rounds. In the illustrated example, the number of rounds is r.

Input data $X_i$ of each round-function executing part is n-bit data under encryption. An output $X_{i+1}$ of a round function in a certain round is supplied as an input to the next round. As the other input data of each round-function executing part, data based on the expanded key K' output from the key scheduling is used. A key input to each round-function executing part and applied to execute a round function is referred to as a round key. In the diagram, a round key applied to the i-th round is denoted by $RK_i$. The expanded key K' is configured as, for example, concatenated data of round keys $RK_1$ to $RK_r$ for r rounds.

The configuration illustrated in FIG. 3 is the configuration of the encryption processing part 12 in which input data to the first round, viewed from the input side of the encryption processing part 12, is denoted by $X_0$, data output from the i-th round function is denoted by $X_i$, and a round key is denoted by $RK_i$. Note that, depending on the structure of the encryption processing part 12, for example, by setting the application sequence of applied round keys to be opposite from that in the encryption processing and by inputting ciphertext to the encryption processing part 12, the encryption processing part 12 can be configured to output plaintext.

The round-function executing parts 20 of the encryption processing part 12 illustrated in FIG. 3 may have various forms. Round functions can be classified according to structures adopted by respective encryption algorithms. Representative structures include the following:

(a) SPN (Substitution Permutation Network) structure;
(b) Feistel structure; and
(c) Generalized Feistel structure.

Figure 4:
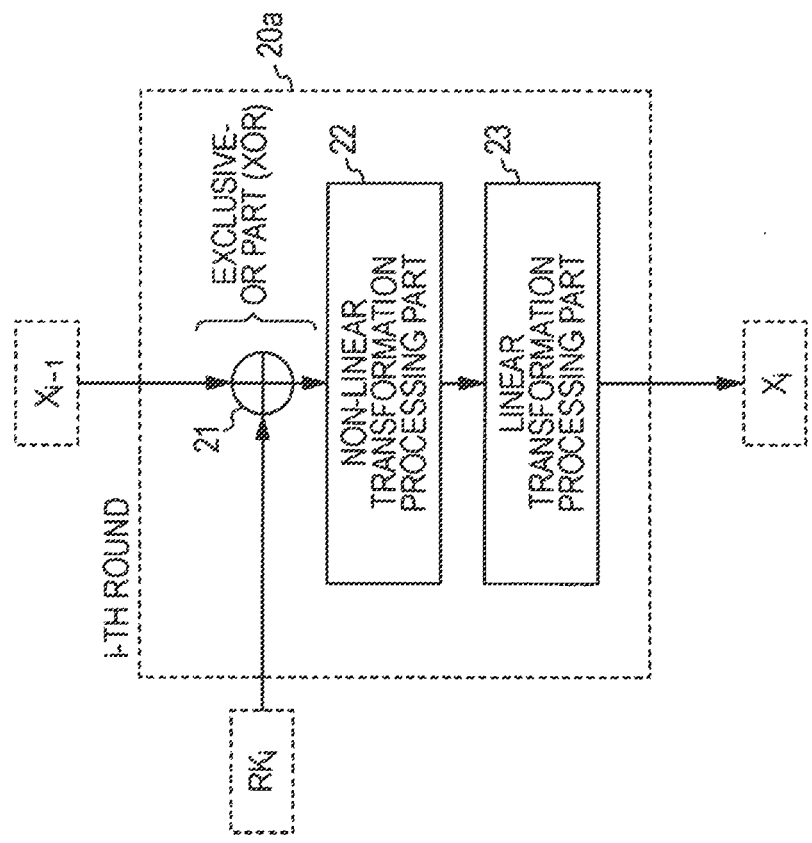
FIG. 4 is a diagram describing an SPN-structure round function serving as a configuration example of a round-function executing part.
Figure 5:
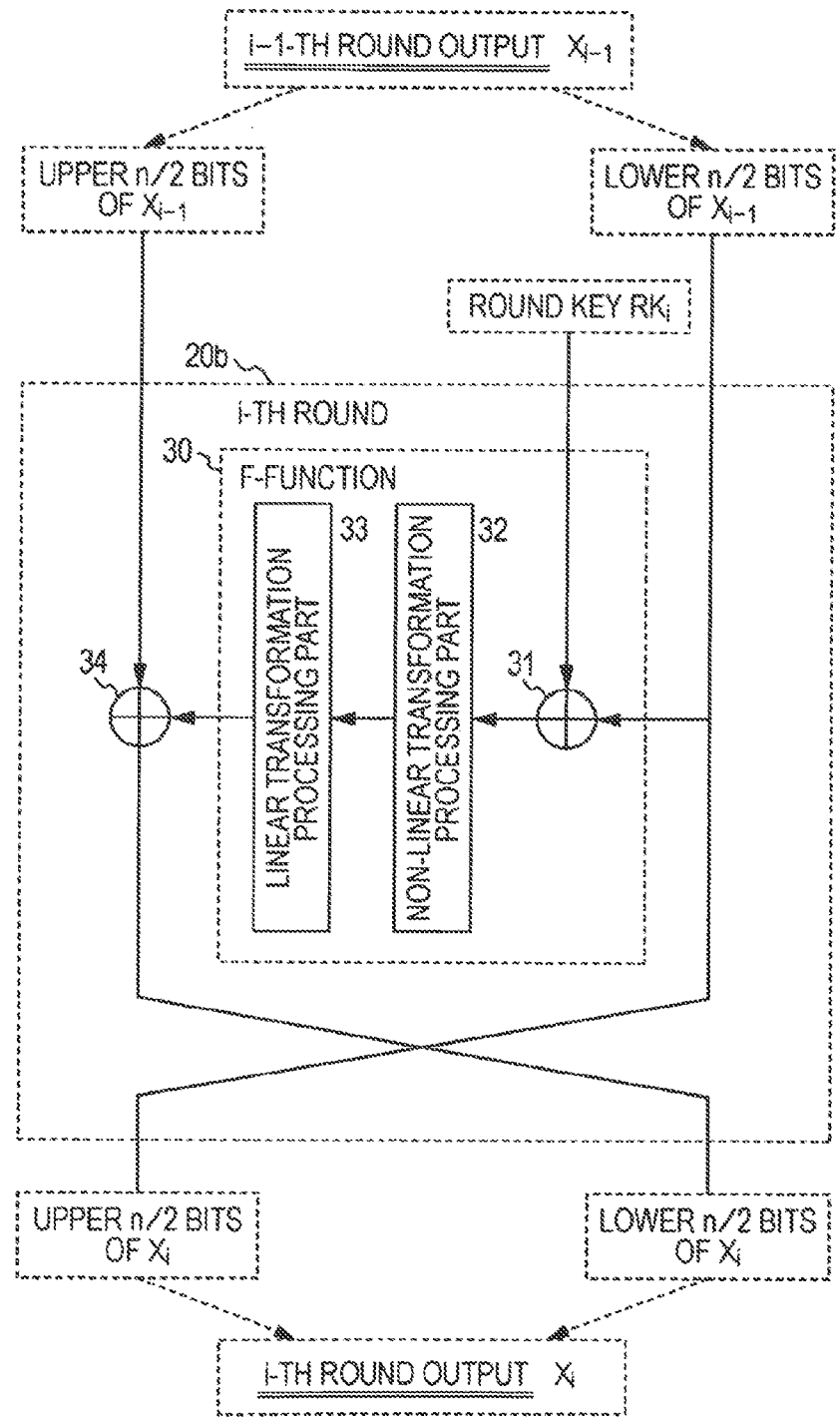
FIG. 5 is a diagram describing a Feistel structure serving as a configuration example of the round-function executing part.

These specific structures will now be described below with reference to FIG. 4 through FIG. 6.

(a) SPN-Structure Round Function

First of all, with reference to FIG. 4, an SPN-structure round function serving as a configuration example of the round-function executing part 20 will be described. An SPN-structure round-function executing part 20a has a so-called SP-type structure in which a non-linear transformation layer (S layer) and a linear transformation layer (P layer) are connected. As illustrated in FIG. 4, the SPN-structure round-function executing part 20a is constructed of an exclusive-OR calculating part 21 that performs an exclusive-OR (EXOR) operation on the entire n-bit input data and a round key, a non-linear transformation processing part 22 that takes the operation result obtained by the exclusive-OR calculating part 21 as an input and performs non-linear transformation of the input data, a linear transformation processing part 23 that takes the non-linear transformation processing result obtained by the non-linear transformation processing part 22 as an input and performs linear transformation processing of the input data, and the like. The linear transformation processing result obtained by the linear transformation processing part 23 is output to the next round. The output of the last round is ciphertext. Note that, although the processing sequence of the exclusive-OR calculating part 21, the non-linear transformation processing part 22, and the linear transformation processing part 23 is illustrated in the example shown in FIG. 4, the sequence of the processing parts is not limited thereto, and the processing may be performed in other sequences.

(b) Feistel Structure

Next, with reference to FIG. 5, a Feistel structure serving as a configuration example of the round-function executing part 20 will be described. A Feistel structure performs, as illustrated in FIG. 5, the processing by splitting n-bit input data from the previous round (input text in the first round) into two equal pieces of n/2-bit data and exchanging the two pieces of data for each other on a round-by-round basis.

In the processing applying a round-function executing part 20b with a Feistel-structure, as illustrated in the drawing, one piece of n/2-bit data and a round key are input to an F-function part 30. The F-function part 30 has, as in the above-described SPN structure, a so-called SP-type structure in which a non-linear transformation layer (S layer) and a linear transformation layer (P layer) are connected.

One piece of n/2-bit data from the previous round and a round key are input to an exclusive-OR calculating part 31 of the F-function part 30 and exclusive-or (EXOR) processing is performed. Further, this result data is input to a non-linear transformation processing part 32 to be non-linearly transformed. Further, the non-linear transformation result is input to a linear transformation processing part 33 to be linearly transformed. The linear transformation result is output as the result data of processing of the F-function.

Further, the F-function output and the other piece of n/2-bit data input from the previous round are input to an exclusive-OR calculating part 34 and an exclusive-OR operation (EXOR) is executed. The execution result is set as an input to an F-function of the next round. Note that the n/2-bits set as an input to the F-function of the i-th round illustrated in the diagram are applied to an exclusive-OR operation with the output of the F-function of the next round. In this manner, the Feistel structure executes data transformation processing applying F functions while exchanging the inputs for each other on a round-by-round basis.

(c) Generalized Feistel Structure

Next, with reference to FIG. 6, a generalized Feistel structure serving as a configuration example of the round-function executing part 20 will be described. The Feistel structure which has been described above with reference to FIG. 5 performs the processing by splitting n-bit plaintext into two equal pieces having n/2 bits. That is, the number of divisions d is two in the processing. Note that the number of divisions may also be referred to as the number of data lines.

A generalized Feistel structure sets the number of data lines (the number of divisions) d to any integer greater than or equal to two. Various generalized Feistel structures can be defined according to the value of the number of data lines (the number of divisions) d. In the example illustrated in FIG. 6, the number of data lines (the number of divisions) d is four, and n/4-bit data is input to each data line. In each round, one or more F-functions serving as round functions are executed. The illustrated example is a configuration example of performing round operations using two F-function parts in each round.

The configuration of F-function parts 41 and 42 is similar to the configuration of the F-function part 30 described above with reference to FIG. 5. The F-function parts 41 and 42 are configured to perform an exclusive-OR operation on a round key and an input value, non-linear transformation processing, and linear transformation processing. Note that a round key input to each of the F-function parts is adjusted so that the number of bits of the round key coincides with that of input bits. In the illustrated example, the number of bits of round keys input to the respective F-function parts 41 and 42 is n/4 bits. These keys are generated by bit-segmenting each of round keys constituting an expanded key. Note that, let d be the number of data lines (the number of divisions), then data input to each line is n/d bits, and the number of bits of a key input to each F-function is adjusted to n/d bits.

Figure 6:
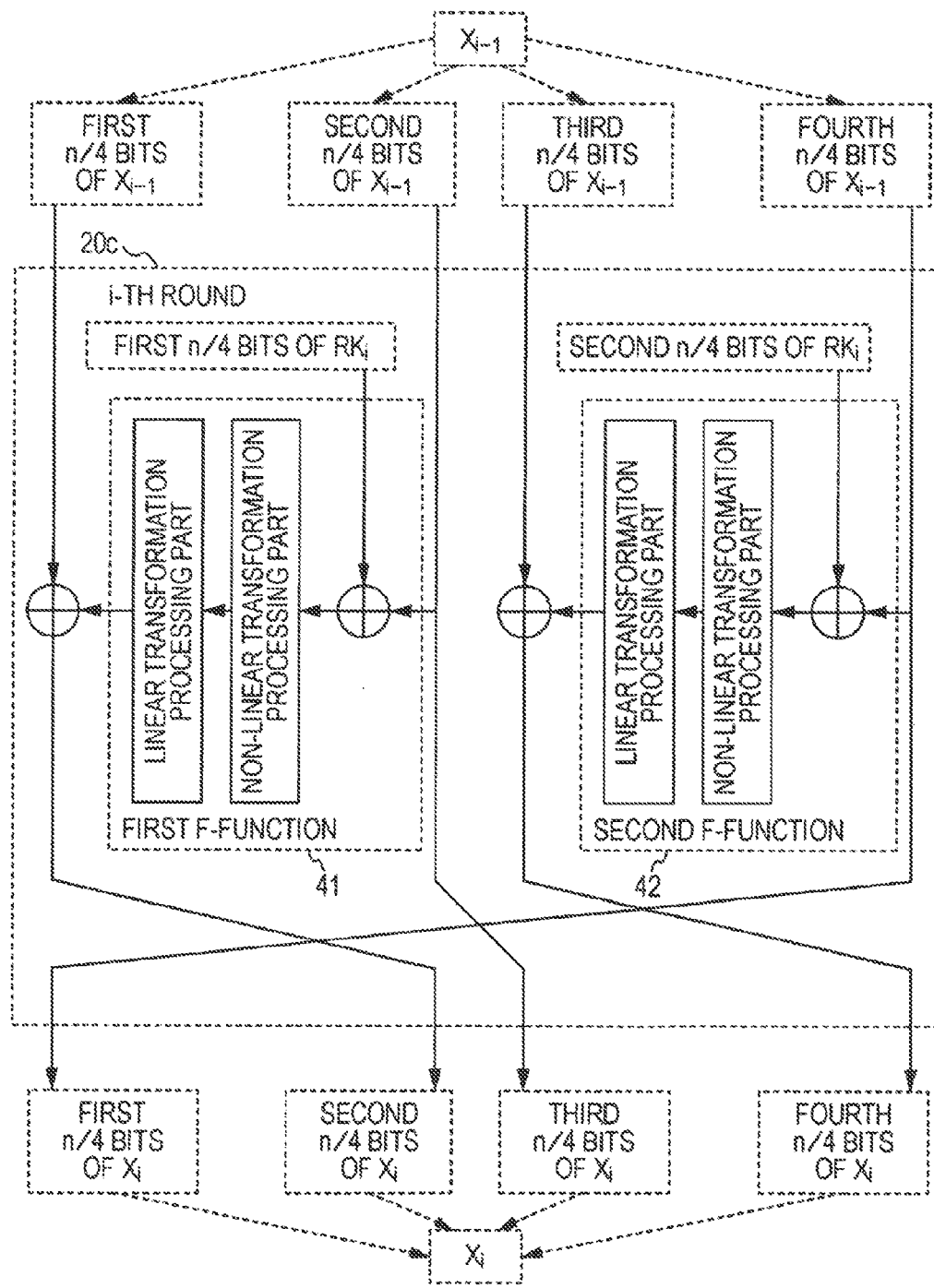
FIG. 6 is a diagram describing a generalized Feistel structure serving as a configuration example of the round-function executing part.

Note that the generalized Feistel structure illustrated in FIG. 6 is a configuration example in which, let d be the number of data lines (the number of divisions), then d/2 F-functions are executed in parallel to one another in each round. A generalized Feistel structure can be configured to execute at least one and less than or equal to d/2 F-functions in each round.

As has been described with reference to FIG. 4 through FIG. 6, the round-function executing parts 20 of the encryption processing part 12 in a common-key blockcipher can have one of the following structures:

(a) SPN (Substitution Permutation Network) structure;
(b) Feistel structure; and
(c) Generalized Feistel structure.

These round-function executing parts each have a so-called SP-type structure in which a non-linear transformation layer (S layer) and a linear transformation layer (P layer) are connected. That is, each round-function executing part has a non-linear transformation processing part that performs non-linear transformation processing and a linear transformation processing part that performs linear transformation processing. These transformation processing configurations will be described below.

(Non-Linear Transformation Processing Part)

Figure 7:
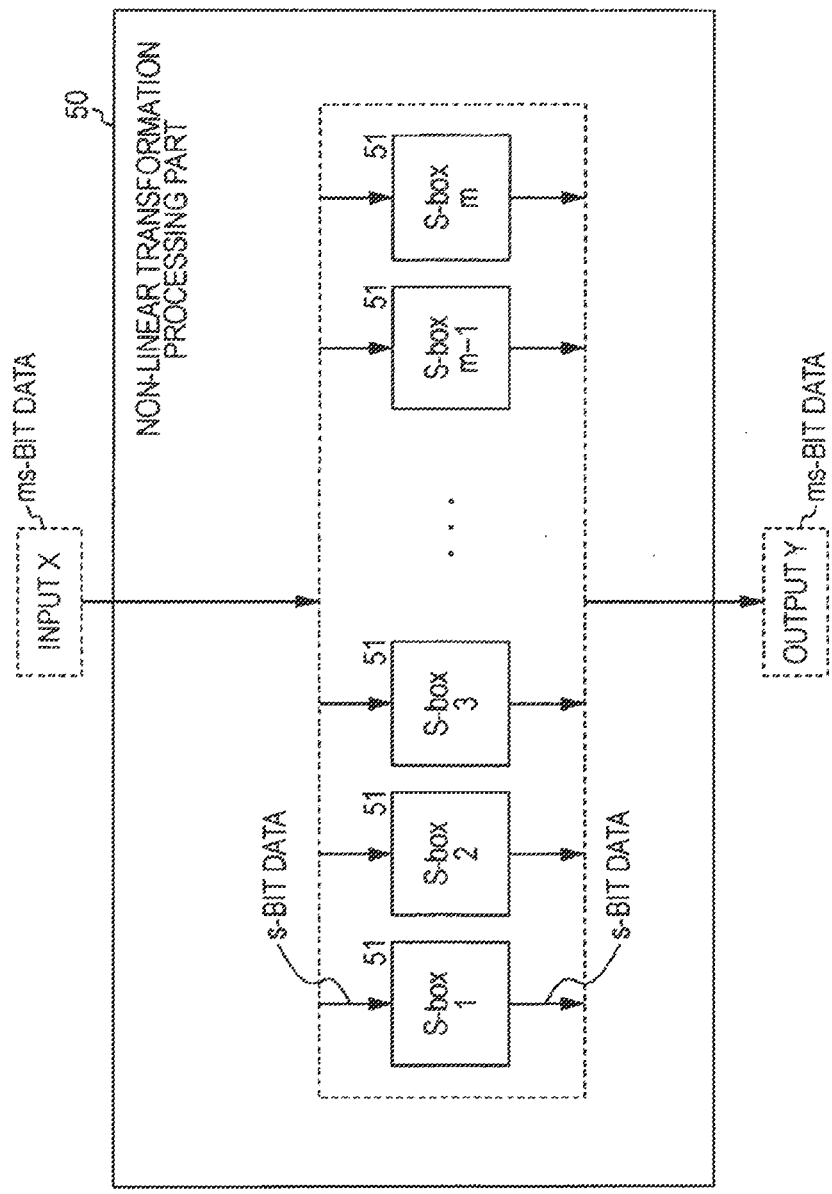
FIG. 7 is a diagram describing a specific example of a non-linear transformation processing part.

With reference to FIG. 7, a specific example of a non-linear transformation processing part will be described. As illustrated in FIG. 7, a non-linear transformation processing part 50 includes, specifically, an array of m non-linear transformation tables referred to as S-boxes 51, each of which takes s bits as an input and generates s bits as an output, in which ms-bit input data is divided into equal pieces of s-bit data, and the pieces of data are input to the respective S-boxes 51 and transformed. Each of the S-boxes 51 performs non-linear transformation processing by applying, for example, a transformation table.

There is a tendency that, as the size of input data increases, so does the cost of implementation. In order to avoid that, in many cases, as illustrated in FIG. 7, a configuration of dividing data X to be processed into plural pieces and performing non-linear transformation of each piece is used. For example, if the input size is ms bits, the input data is divided into m pieces of s-bit data, and the m pieces of s-bit data are input to the respective m S-boxes 51 to be non-linearly transformed by applying, for example, a transformation table, and m pieces of s-bit output data are combined to obtain an ms-bit non-linear transformation result.

(Linear Transformation Processing Part)

Figure 8:
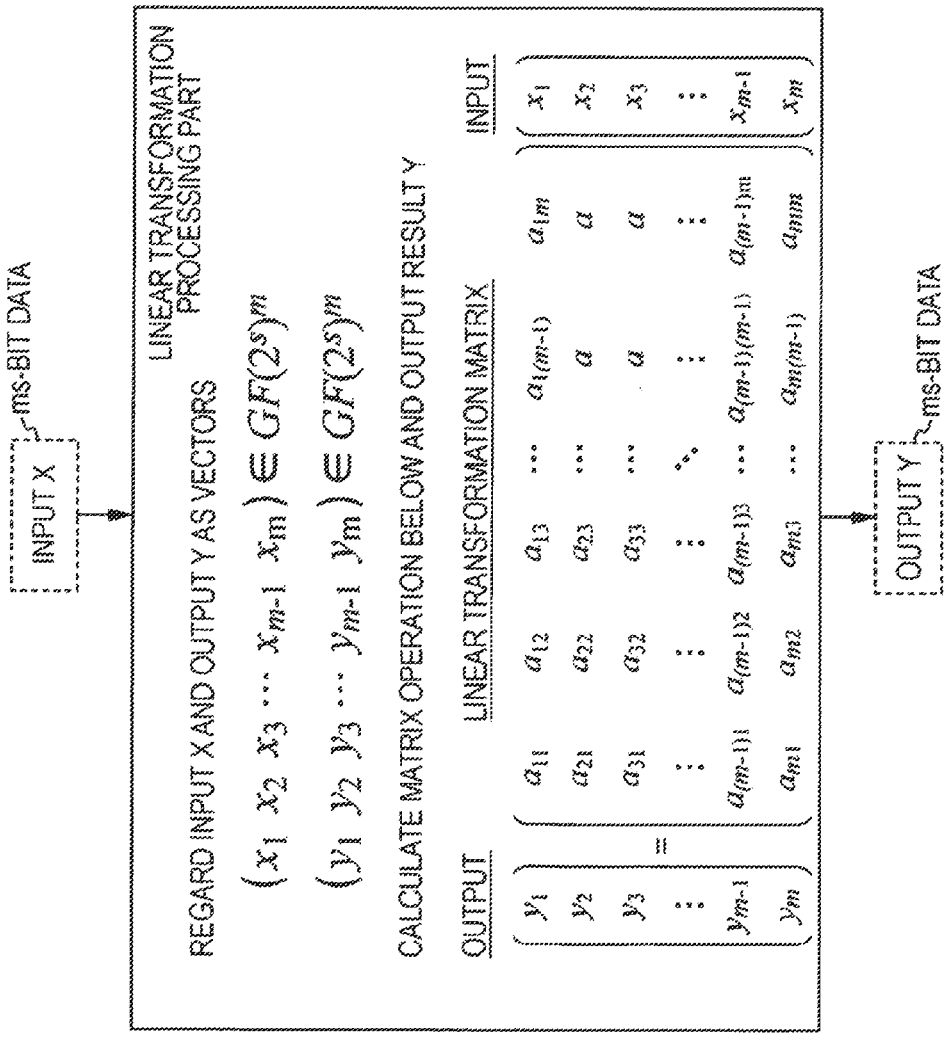
FIG. 8 is a diagram describing a specific example of a linear transformation processing part.

With reference to FIG. 8, a specific example of a linear transformation processing part will be described. A linear transformation processing part takes as an input an input value, such as an ms-bit output value which is output data from the S-boxes as an input value X, applies linear transformation to this input, and outputs an ms-bit result. The linear transformation processing performs linear transformation processing, such as permutation processing of the positions of input bits, and outputs an ms-bit output value Y. The linear transformation processing applies, for example, a linear transformation matrix to the input and performs permutation processing of the positions of the input bits. An example of the matrix is a linear transformation matrix illustrated in FIG. 8.

The elements of the linear transformation matrix applied to the linear transformation processing part can be generally configured as a matrix applying various representations, such as elements in the extension field $GF(2^8)$ or elements in the field $GF(2)$. FIG. 8 illustrates a configuration example of a linear transformation processing part which takes an ms-bit input and generates an ms-bit output and which is defined by an m×m matrix defined over $GF(2^s)$.

[2. Configuration in which Immunity is Enhanced by Arranging a Plurality of Different S-Boxes]

As has been described above, a common-key blockcipher is configured to perform encryption processing by repeatedly executing a round function. The common-key blockcipher processing has a problem of the leakage of keys due to cryptanalysis. The fact that the keys can be analyzed easily by cryptanalysis means that the cipher has low security, leading to a serious problem in applications. In the following, an encryption processing configuration in which immunity is enhanced by arranging a plurality of different S boxes will be described.

As has been described with reference to FIG. 7, the non-linear transformation processing part included in each round-function executing part includes a plurality of S-boxes that perform non-linear transformation processing. Conventionally, a common non-linear transformation processing table is applied to all the S-boxes, and the S-boxes are configured to perform common non-linear transformation processing.

In the present invention, there is proposed a configuration in which attention is paid to vulnerability due to this commonness in the S-boxes, that is, the susceptibleness to attacks, namely, cryptanalysis such as analysis of keys, and the immunity is enhanced by arranging a plurality of different S-boxes.

Hereinafter, as embodiments of the present invention, the following three embodiments will be sequentially described.

(2A) Configuration in which immunity against saturation attacks is enhanced by arranging two or more different types of S-boxes in Feistel or generalized Feistel-type cipher using S-boxes (2B) Configuration in which immunity against algebraic attacks (XSL attacks) is enhanced by mixing two or more different types of S-boxes in blockcipher using S-boxes (2C) Configuration in which the above-described (2A) and (2B) are simultaneously realized in Feistel cipher or generalized Feistel-type cipher using S-boxes (2A) Configuration in which Immunity Against Saturation Attacks is Enhanced by Arranging Two or More Different Types of S-Boxes in Feistel or Generalized Feistel-Type Cipher Using S-Boxes First, the configuration in which the immunity against saturation attacks is enhanced by arranging two or more different types of S-boxes in a Feistel or generalized Feistel-type cipher using S-boxes will be described.

(2A-1. Outline of Saturation Attacks)

First, saturation attacks which are known as attacks on blockciphers will be described. There is a plurality of types of saturation attacks. The first type is an attacking process that uses the characteristic that, if 256 types of values are input one at a time to a specific byte position of plaintext, after round transformation processing is performed for a plurality of rounds, all the 256 types of values appear at a specific byte position of an output value.

Also, as another type of saturation attack, there is an attacking technique that uses the characteristic that the sum of values appearing at a specific byte position, after round transformation is performed for a plurality of rounds, is zero at all times.

For example, as 256 types of plaintext $P_0$ to $P_{255}$ to be input to a common-key blockcipher processing apparatus executing round functions, $P_0 = (0,0,0,0,0,0,0,0)$ $P_1 = (0,0,0,0,0,0,0,1)$

...

$P_{255} = (0,0,0,0,0,0,0,255)$ these types of plaintext $P_0$ to $P_{255}$ are sequentially input. Note that, in the foregoing representations, each [0] indicates 1-byte data 0.

In the case where these types of plaintext $P_0$ to $P_{255}$ are sequentially input, output values obtained after data transformation processing is performed for specific rounds are denoted by $C_0$ to $C_{255}$ in the following manner:

$C_0 = (c_0,?,?,?,?,?,?,?)$ $C_1 = (c_1,?,?,?,?,?,?,?)$

...

$C_{255} = (c_{255},?,?,?,?,?,?,?)$

In the above-described output values, [?] may be any bit value.

These output values $C_0$ to $C_{255}$ have, as has been described above, the characteristic that all the 256 types of values $c_0$ to $c_{255}$ appear at a specific byte position (the first byte position in the above example). If it is known in advance as above that the values from 0 to 255 appear once without distinction of the order of appearance, an attack can be made using this characteristic. It is known that round keys can be estimated by the analysis of output values obtained by sequentially changing the input value.

Further, in the case that the sum (EXOR) of values $c_0$ to $c_{255}$ at a specific byte position included in the outputs $C_0$ to $C_{255}$ is zero, an attack (cryptanalysis) can be carried out using this characteristic. In this manner, keys can be estimated by sequentially inputting 256 types of plaintext $P_0$ to $P_{255}$ and analyzing outputs at a specific byte position.

When transformation results of the round function parts have outputs with a specific regularity such as that described above, that is, all the 256 types of values $c_0$ to $c_{255}$ appear, or the sum (EXOR) of values $c_0$ to $c_{255}$ at a specific byte position is zero, when outputs with such a regularity occur, a saturation attack is an attack (analysis) technique executed on the basis of this regularity.

Therefore, in order to make a cipher that is secure against saturation attacks, it is effective to configure the cipher not to generate such specific outputs as outputs of round function parts at the design stage of the cipher. Note that saturation attacks are not limited to analyses on a byte-by-byte (8 bits) basis; attacks using a similar characteristic can be made on an arbitrary bit length.

(2A-2) Problems in Encryption Processing Applying Feistel Structure or Generalized Feistel Structure Next, problems in encryption processing applying a Feistel structure or a generalized Feistel structure will be discussed.

Regarding a Feistel structure or a generalized Feistel structure, both are configured to repeat a round operation applying an F-function part of SP-type including a non-linear transformation processing part and a linear transformation processing part, as has been described above with reference to FIG. 5 and FIG. 6. In a Feistel structure, the number of data lines (the number of divisions) is limited to two; in a generalized Feistel structure, however, the difference resides in that the number of data lines (the number of divisions) is set to any number greater than or equal to two.

The following description assumes the configuration in which, in encryption processing applying a Feistel or generalized Feistel structure, S-boxes are used in a non-linear transformation processing part in each F-function which is a round-function executing part. As has been described above with reference to FIG. 7, the S-boxes respectively perform, for example, by applying a non-linear transformation table, non-linear transformation processing of m pieces of s-bit data into which ms-bit data that is input to a non-linear transformation processing part is divided.

As has been described above, regarding F-functions applied to execution of round functions in a conventional blockcipher, the same F-function is repeatedly employed in each round. A Feistel structure or a generalized Feistel structure in which the same F-function is set in each round is more susceptible to the above-described saturation attacks. The reason for this will be described with reference to FIG. 9.

Figure 9:
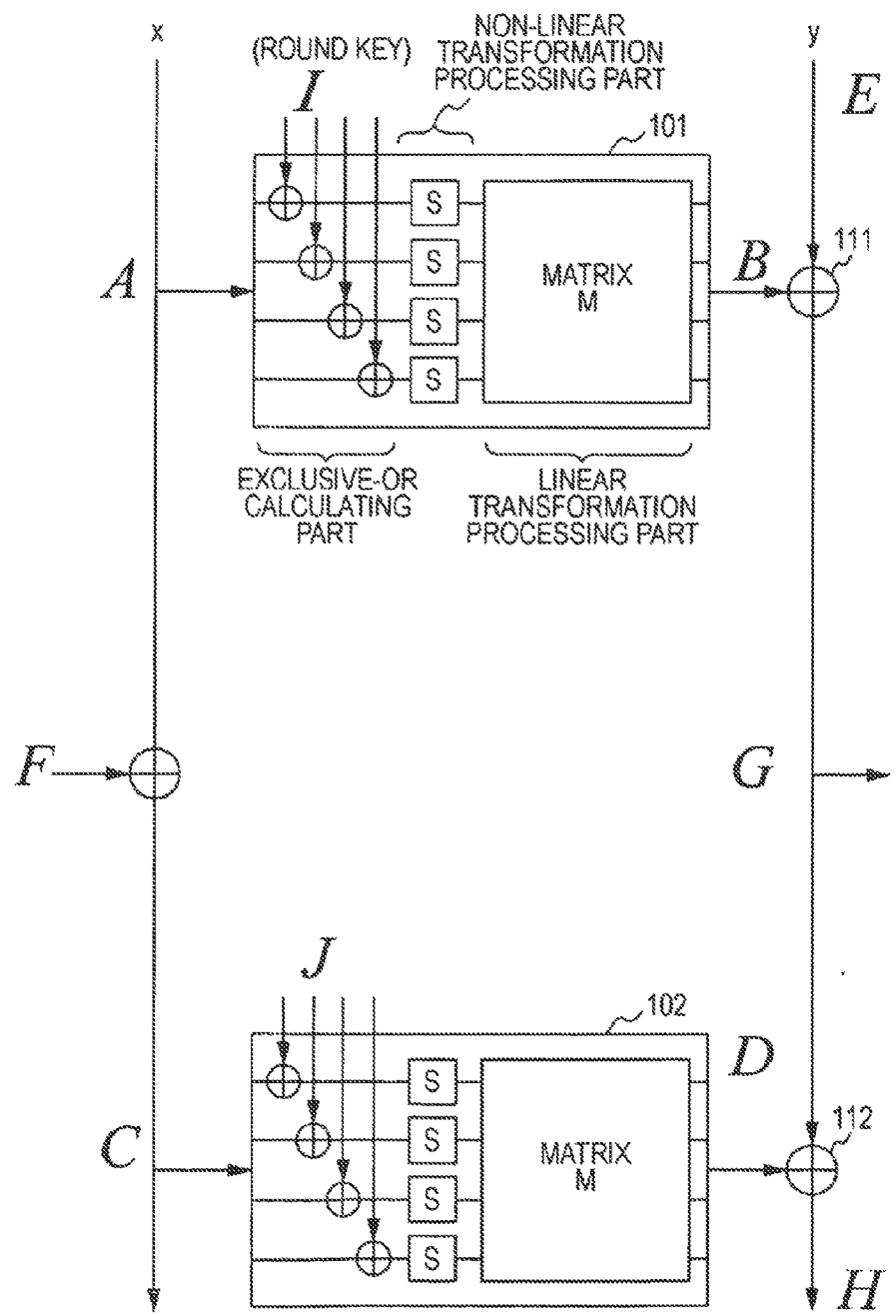
FIG. 9 is a diagram describing a general configuration example of a Feistel structure or a generalized Feistel structure.

FIG. 9 is a diagram showing the configuration of a cut-out portion of a Feistel structure or a generalized Feistel structure. That is, two round-function executing parts, namely, F-functions 101 and 102, included in a cipher with a Feistel structure or a generalized Feistel structure is illustrated in FIG. 9. The two F-functions 101 and 102 are F-functions that have the same input data line (x) and output data line (y) and are vertically adjacent to each other.

The two F-functions 101 and 102 include exclusive-OR calculating parts that calculate an exclusive-OR with a round key, non-linear transformation processing parts, and linear transformation processing parts. In this processing example, the F-functions 101 and 102 are configured to perform 32-bit input and output processing. The non-linear transformation processing parts each include four S-boxes, and each of the S-boxes takes an 8-bit input and produces an 8-bit output.

A to J shown in FIG. 9 denote various types of data, that is:

A: an input to the former F-function 101;

B: an output of the former F-function 101;

C: an input to the latter F-function 102;

D: an output of the latter F-function 102;

E: data for an exclusive-OR operation with the output B of the former F-function 101;

F: data for an exclusive-OR operation with data A;

G: a result of an exclusive-OR operation on data B and data E;

H: a result of an exclusive-OR operation on data D and data G;

I: a round key input to the former F-function 101; and

J: a round key input to the latter F-function 102 these types of data are denoted.

In the following description, in the case where 32-bit data to be processed by each of the F-functions 101 and 102 is illustrated in increments of a byte (eight bits), for example, if data A is 32-bit data, as concatenated data of 1-byte (8-bit) data $A[0]$, $A[1]$, $A[2]$, and $A[3]$:

$$A=A[0]|A[1]|A[2]|A[3]$$

data A is represented as above.

Here, it is assumed that, as plaintext to be input to the encryption processing configuration illustrated in FIG. 9, 256 types of data, for example, $$P_0=(0,0,0,0)$$

$$P_1=(1,0,0,0)$$

...

$$P_{255}=(255,0,0,0)$$

these types of plaintext $P_0$ to $P_{255}$ are sequentially input. Note that, in the above-described representations, each of [0], [1], ... [255] indicates 1-byte data.

It is assumed that these input values serve as input data A for the former F-function 101 illustrated in FIG. 9. Data A is such that, as have been described above, in the case where 256 types of data are observed, it is assumed that all the 256 types of values from 0 to 255 appear at the first byte $A[0]$, and the remaining byte positions are fixed to the same value (this is assumed because an attacker trying to launch a saturation attack may generate such a situation by controlling plaintext input).

Further, assuming that the value of data F for an exclusive-OR operation with data A remains fixed at all times in sequential input processing of the above-described 256 types of data A, it is ensured that all the 256 types of values from 0 to 255 appear at the first byte $C[0]$ of input data C of the latter F-function 102, and the remaining byte positions are fixed to the same value.

On this occasion, depending on the combination of the following values of items of data:

I: a round key input to the former F-function 101;
J: a round key input to the latter F-function 102; and
F: data for an exclusive-OR operation with data A, the following equation may hold true at all times, that is:

$$A[0](EXOR)I[0]=C[0](EXOR)J[0]$$

The above-described equation may hold true.

Note that (EXOR) denotes an exclusive-OR operation, and $A[0](EXOR)I[0]$ denotes an exclusive-OR operation on data $A[0]$ and data $I[0]$, and
$C[0] (EXOR)J[0]$ denotes an exclusive-OR operation on data $C[0]$ and data $J[0]$.

Equation: $A[0](EXOR)I[0]=C[0](EXOR)J[0]$

This equation means that the same value is input at all times to two S-boxes in the two F-functions 101 and 102. These S-boxes perform the same non-linear transformation processing, and outputs the same output value for the same input value. Therefore, the two S-boxes of the two F-functions 101 and 102 have the same output at all times. The same S-box outputs are linearly transformed by matrices of the linear transformation processing parts of the individual F-functions 101 and 102, and the results are output to exclusive-OR calculating parts on data line (y) on the right-hand side. These are exclusive-OR calculating parts 111 and 112 shown in the diagram.

Values B and D output from the two F-functions 101 and 102 to the exclusive-OR calculating parts 111 and 112, respectively, have a specific differential value Δ. That is, $$B(EXOR)\Delta=D.$$

In this case, the exclusive-OR calculating part 111 calculates data G by computing $$G=B(EXOR)E,$$

and the exclusive-OR calculating part 112 computes $$H=G(EXOR)D.$$

Since G=B(EXOR)E and B(EXOR)Δ=D, the above-described equation H=G(EXOR)D is $$H = B(EXOR)E(EXOR)B(EXOR)\Delta$$
$$= E(EXOR)\Delta.$$

That is, the result of performing an exclusive-OR operation on values having a fixed differential value is a fixed value Δ, and, as a result, $$H = B(EXOR)E(EXOR)B(EXOR)\Delta$$
$$= \Delta(EXOR)E$$
$$= E(EXOR)\Delta.$$

That is, the output H of the exclusive-OR calculating part 112 is the result of an exclusive-OR operation on the data E and the fixed value Δ. Although the round function (F-function) is executed for two stages, the result is that data is not permuted. Using this characteristic, a round key of a subsequent round can be easily estimated. That is, if a subsequent round exists, a temporarily set key is used in that round to decrypt data up to the data H, and whether or not this characteristic can be observed is checked, thereby probabilistically determining whether the temporarily used key is correct or not. In other words, a round key can be estimated, and an analysis can be done by making a saturation attack, In order to avoid such situations, a matrix portion applied in linear transformation processing can be changed depending on the position of each F-function. In the case where S-boxes of individual F-functions are the same, if a condition similar to the above occurs, depending on the relations among the elements of a linear transformation matrix, some of the bytes may offset each other at the time the output D of the latter F-function 102 is exclusive-ORed with the data G, resulting in a favorable situation for an attacker.

Accordingly, in the case where the non-linear transformation processing with the same configuration is applied at least in a plurality of F-functions that output data to the same line, keys may be estimated by making a saturation attack. Further, depending on the S-boxes, as a result of operations (EXOR) thereof, that is, $$S(A[0](EXOR)I[0](EXOR)S(C[0](EXOR)J[0])$$

as a result of the results thereof, it cannot be said that the case in which all the 256 types of values from 0 to 255 appear is desirable. Under normal circumstances, even in the case where both $A[0]$ and $C[0]$ output 256 different types of values, the results of operations (EXOR) on $A[0]$ and $C[0]$ may not necessarily take all the 256 types of output values. However, such a situation may arise depending on the S-boxes. If such an unexpected situation arises, information that can be used for making an attack (information indicating that all the values are different) is saved for the next stage, resulting in a favorable situation for an attacker.

(2A-3) Method of Enhancing Immunity by Using Plural Types of S-Boxes

A configuration example of increasing the difficulty of estimating keys by making a saturation attack will be described. That is, even in the case where the foregoing conditions are satisfied, non-linear transformation processing parts of individual F-functions, namely, S-boxes, are configured so that data prior to and data subsequent to executing a round function will not become equivalent by data offsetting.

Figure 10:
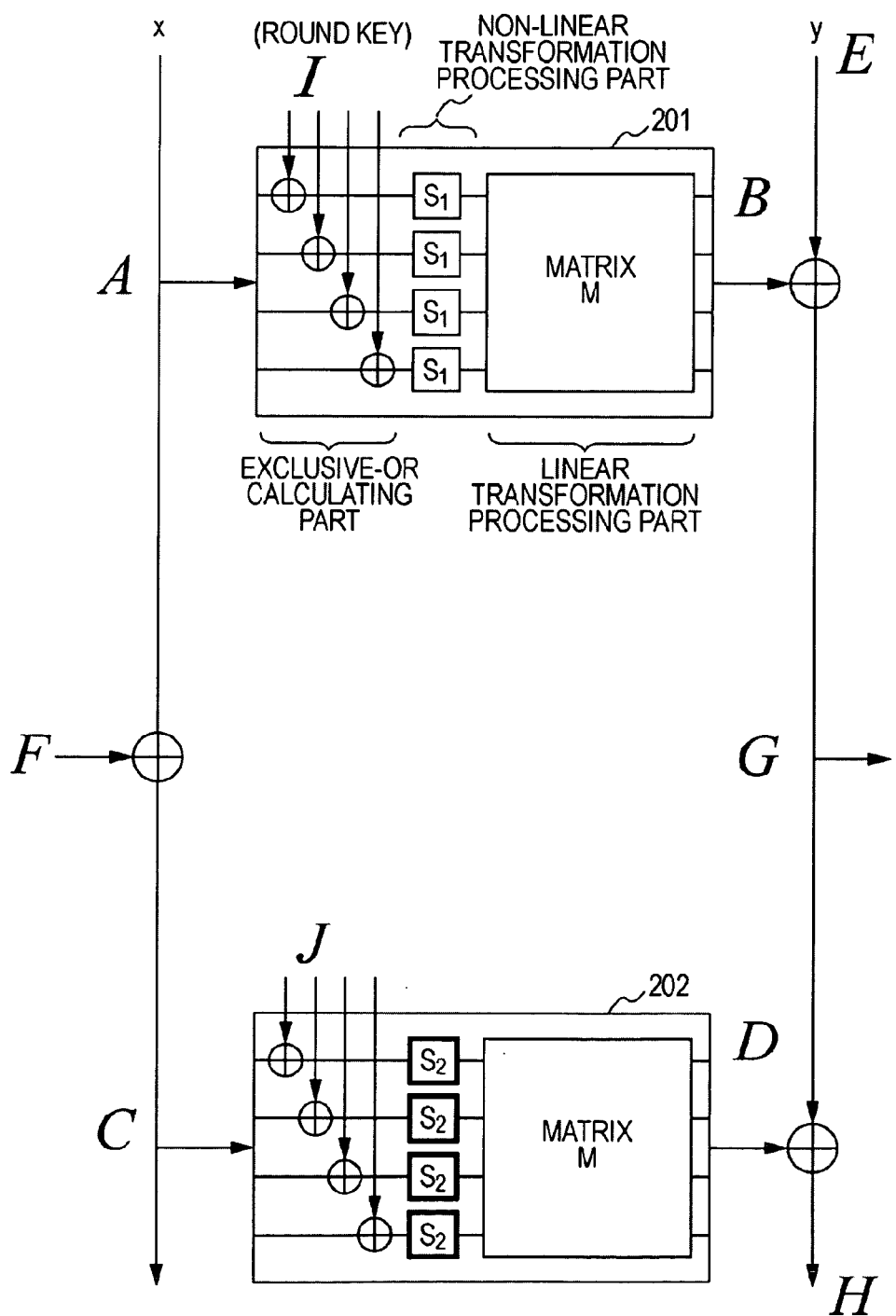
FIG. 10 is a diagram describing a configuration example of a Feistel structure or a generalized Feistel structure in which different S-boxes are arranged.

A specific example thereof will now be described with reference to FIG. 10. The configuration illustrated in FIG. 10 shows, as in FIG. 9, the configuration of a cut-out portion of a Feistel structure or a generalized Feistel structure. FIG. 10 illustrates F-functions 201 and 202 which have the same input data line (x) and output data line (y) and are vertically adjacent to each other.

The two F-functions 201 and 202 include exclusive-OR calculating parts that calculate an exclusive-OR with a round key, non-linear transformation processing parts, and linear transformation processing parts. The F-functions 201 and 202 are configured to perform 32-bit input and output processing. The non-linear transformation processing parts each include four S-boxes, and each of the S-boxes takes an 8-bit input and produces an 8-bit output.

As in FIG. 9, A to J shown in FIG. 10 denote these types of data:

A: an input to the former F-function 201;
B: an output of the former F-function 201;
C: an input to the latter F-function 202;
D: an output of the latter F-function 202;
E: data for an exclusive-OR operation with the output B of the former F-function 201;
F: data for an exclusive-OR operation with data A;
G: a result of an exclusive-OR operation on data B and data E;
H: a result of an exclusive-OR operation on data D and data G;
I: a round key input to the former F-function 201; and
J: a round key input to the latter F-function 202

In the configuration illustrated in FIG. 10, S-boxes of non-linear transformation processing parts set in the former F-function 201 and the latter F-function 202, respectively, are configured to use different S-boxes [S1] and [S2].

That is, the S-boxes [S1] performing non-linear transformation processing in the former F-function 201 and the S-boxes [S2] performing non-linear transformation processing in the latter F-function 202 perform different types of non-linear transformation processing. Specifically, the S-boxes [S1] and [S2] perform non-linear transformation processing using, for example, different non-transformation tables. The S-boxes [S1] and [S2] may not have the same output for the same input.

Here, it is assumed that the individual S-boxes S1 and S2 are two different S-boxes satisfying the following conditions.

Assuming that the individual S-boxes S1 and S2 are S-boxes that perform non-linear transformation processing with n-bit input and n-bit output, the following conditions are satisfied:

(Condition 1)

If all pieces of s-bit data, namely, $2^s$ x's, are sequentially input to any s-bit data c,
output $S1(x)$ of the first S-box [S1] for input data [x] and output $S2(x(EXOR)c)$ of the S-box [S2] for input data [x(EXOR)c]
have at least one different value. That is, $$S1(x)(EXOR)S2(x(EXOR)c)$$

the above-described equation does not yield a fixed value.
Further,
(Condition 2)
if all pieces of s-bit data, namely, $2^s$ x's, are sequentially input to any s-bit data c,
output $S1(x)$ of the first S-box [S1] for input data [x] and output $S2(x(EXOR)c)$ of the S-box [S2] for input data [x(EXOR)c]
have at least one duplicate value. That is, $$S1(x)(EXOR)S2(x(EXOR)c)$$

the above-described equation does not have all of $2^s$ appearing once.

This shows the condition that, if it is assumed in FIG. 10 that
data A is [x], and
data F is [c],
output $S1(x)$ of the S-box [S1] of the former F-function 201 and
output $S2(x(EXOR)c)$ of the S-box [S2] of the latter F-function 202
will not be the same, or not all the results of exclusive-OR operations on the outputs will be different values.

Two S-boxes [S1] and [S2] satisfying the conditions are set as illustrated in FIG. 10.

That is, a certain F-function has a non-linear transformation processing part using only S-boxes [S1], and the next F-function has a non-linear transformation processing part using only S-boxes [S2]. If there are more rounds thereafter, S-boxes [S1] and [S2] are similarly set in this order in non-linear transformation processing parts of individual F-functions.

By configuring non-linear transformation processing to be different, that is, by arranging a plurality of different S-boxes, in vertically adjacent F-functions with the same input data line and output data line, the probability of data appearing on the output line to have strong correlation with that appearing on the same output line prior to executing the round function can be greatly reduced.

That is, the use of S-boxes satisfying the above-described (condition 1) ensures that, even in the case where inputs to the two S-boxes have a fixed difference, the results of performing exclusive-OR operations on outputs thereof have different values at least once, thereby guaranteeing that the outputs will not be completely offset with each other.

Also, the use of S-boxes satisfying the above-described (condition 2) ensures that, even in the case where inputs to the two S-boxes, have a fixed difference, the results of performing exclusive-OR operations on outputs thereof have a duplicate value at least once, thereby impairing the characteristic that can be used for making attacks. Therefore, by arranging two S-boxes in the above-described manner, advantageous conditions for attackers making saturation attacks are minimized. It can thus be expected that the immunity against attacks will be enhanced.

That is, even in the case where values input to the S-boxes in the individual F-functions 201 and 202 are equal in FIG. 10, that is, even if $$A[0](EXOR)I[0]=C[0](EXOR)J[0],$$

values output from the S-boxes in the individual F-functions, namely,

S1(A[0](EXOR)I[0]) and

S2(C[0](EXOR)J[0])

will not be the same in all the cases. As a result, F-function outputs B and D of the individual F-functions 201 and 202 will not be completely the same. There will be no situation, such as that described with reference to FIG. 9, where

E=H(EXOR)A holds true, and the probability of data on one data line before and after execution of a round function (F-function) having a fixed difference can be eliminated.

By arranging a plurality of different S-boxes that perform different types of non-linear transformation processing in vertically adjacent F-functions having the same input data line and output data line, the difficulty of saturation attacks can be greatly increased, and the immunity against attacks can be enhanced.

(Development System-1)

The foregoing configuration described with reference to FIG. 10 pays attention only to the relation between two F-functions and derives the condition that different S-boxes are set in these two F-functions. The similar idea applies to three or more F-functions. For example, the immunity against saturation attacks can be expected to be enhanced by arranging a plurality of different S-boxes in F-functions, as illustrated in FIG. 11.

Figure 11:
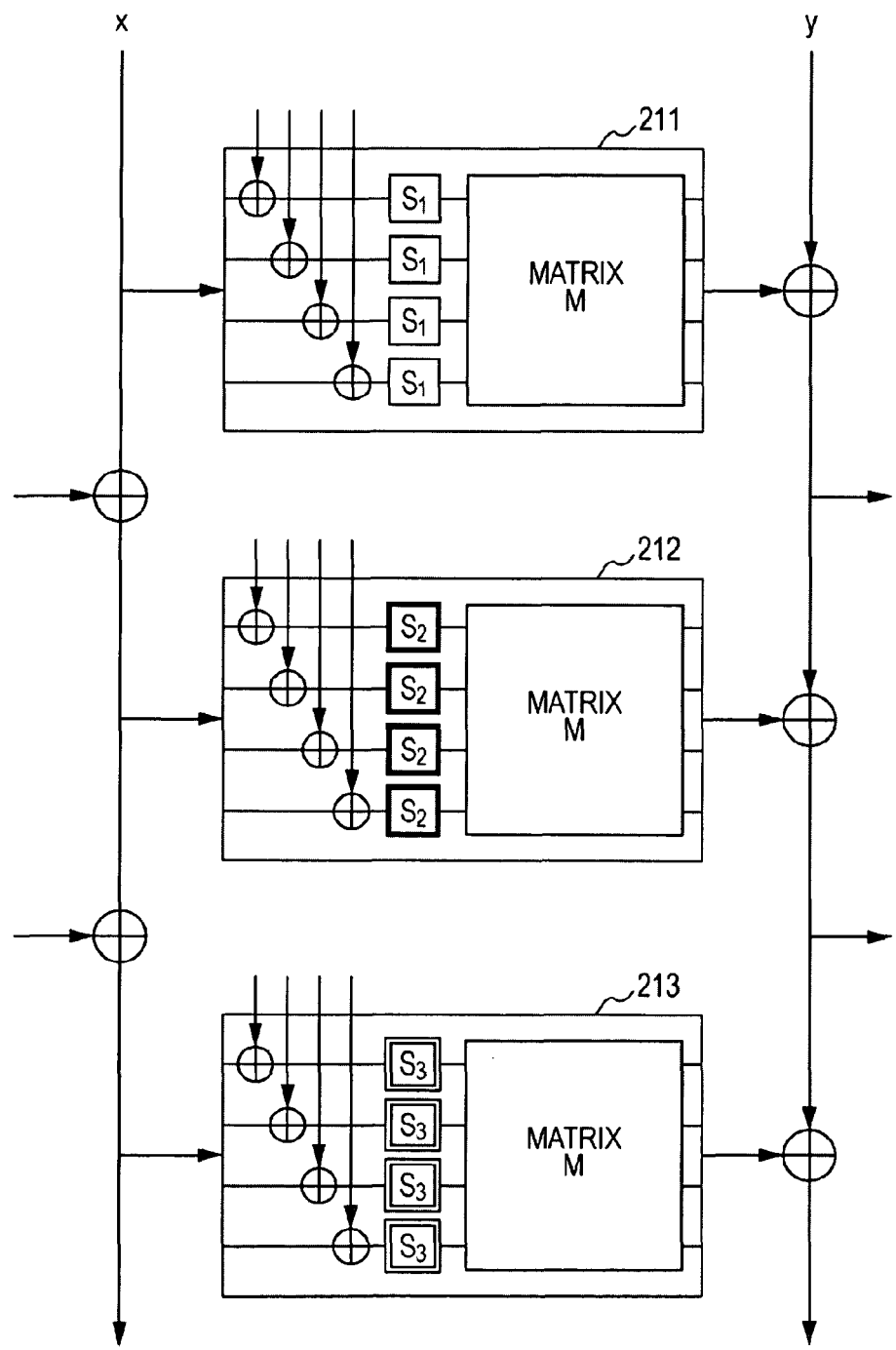
FIG. 11 is a diagram describing a configuration example in which different S-boxes are arranged to enhance the immunity against saturation attacks.

FIG. 11 illustrates the configuration of a cut-out portion of a Feistel structure or a generalized Feistel structure. FIG. 11 illustrates three F-functions 211 to 213 which have the same input data line (x) and output data line (y) and are vertically adjacent to one another.

S-boxes [S1] are set in a non-linear transformation processing part of the F-function 211;

S-boxes [S2] are set in a non-linear transformation processing part in the F-function 212; and S-boxes [S3] are set in a non-linear transformation processing part in the F-function 213.

Note that $S1 \neq S2 \neq S3$.

In this manner, conditions required for the plurality of S-boxes should be:

(Condition 1)

Given sets $S1, S2, \ldots, Sk$ of $k$ ($k>2$) S-boxes, and a pair of two different S-boxes $Si$ and $Sj$ ($i \neq j$). If all possible $2^s$ x's are given as inputs to any c, Si(x) and Sj(x(EXOR)c)

outputs of these S-boxes do not completely collide with each other, and the S-boxes output different values at least once. That is, the results of performing exclusive-OR operations on Si(x) and Sj(x(EXOR)c) do not yield a fixed value.

Further, (Condition 2)

given sets $S1, S2, \ldots, Sk$ of $k$ ($k>2$) S-boxes, and a pair of two different S-boxes $Si$ and $Sj$ ($i \neq j$). If all possible $2^n$ x's are given as inputs to any c, Si(x) and Sj(x(EXOR)c)

outputs of these S-boxes do not have all the $2^n$ values appearing once. That is, the outputs of the S-boxes have at least one duplicate value.

By setting the sets $S1, S2, \ldots, Sk$ of S-boxes satisfying these conditions and arranging these F-functions in a plurality of F-functions which have the same input data line (x) and output data line (y) and which are arranged vertically adjacent to one another in a sequential manner, the probability of data appearing on the output line to collide with that appearing on the same output line prior to executing a round function can be greatly reduced. As a result, the difficulty of saturation attacks can be greatly increased, and the immunity against attacks can be enhanced.

(Development System-2)

Taking practical implementation into consideration, even in the case where multiple types of S-boxes are included in the individual F-functions, it may be desirable that the same combination of S-boxes be included in each F-function.

That is, in the case where data transformation corresponding to F-functions is performed using, for example, hardware or software, if the same combination of S-boxes is included in each F-function, hardware or software serving as the F-functions can be configured as the same hardware or software, and data transformation based on the F-functions can be performed in each round only by changing inputs and outputs in each round as needed.

Figure 12:
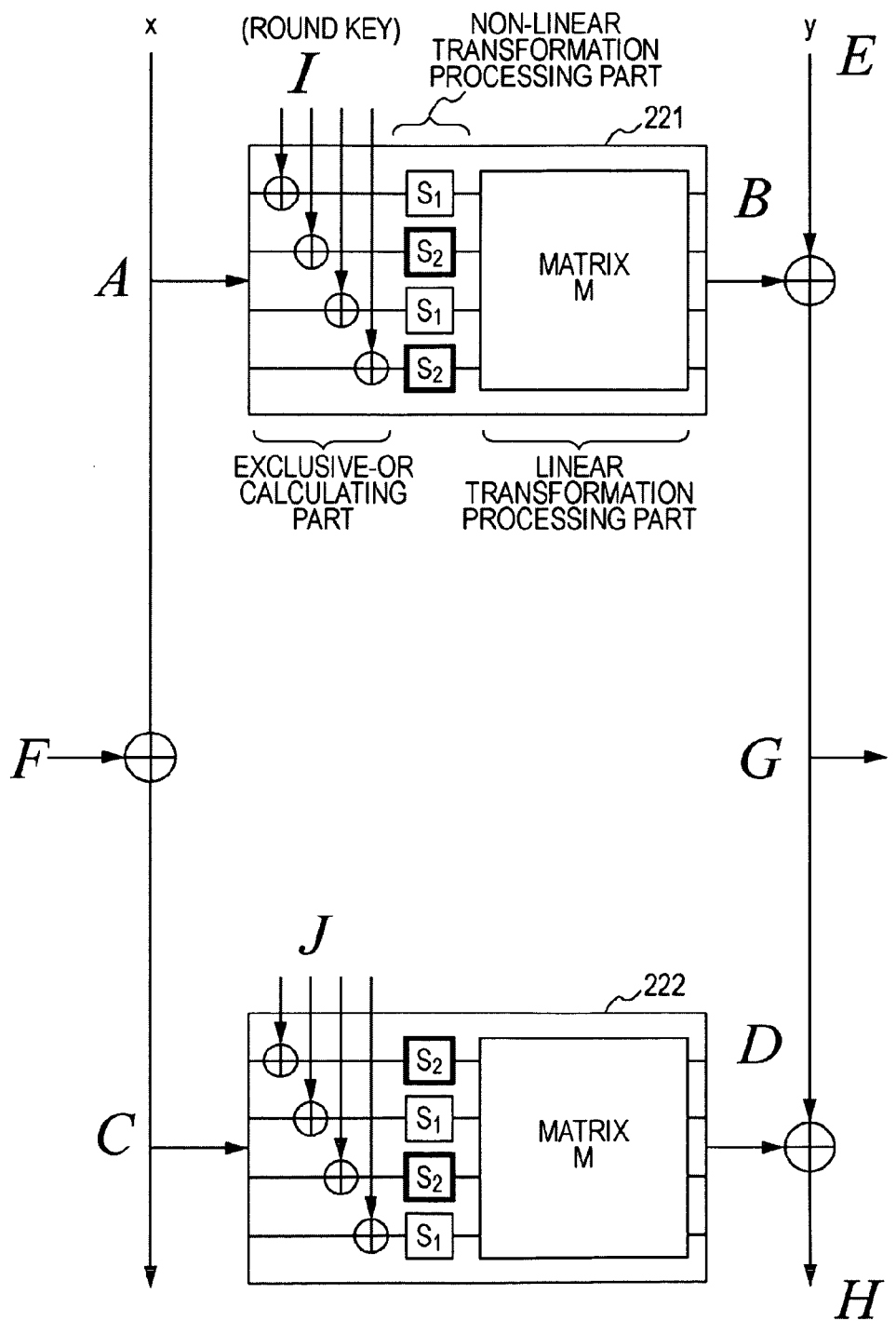
FIG. 12 is a diagram describing a configuration example in which different S-boxes are arranged to enhance the immunity against saturation attacks.

Referring to FIG. 12, a specific example will be described. As in FIG. 10, FIG. 12 illustrates the configuration of a cut-out portion of a Feistel structure or a generalized Feistel structure. FIG. 12 illustrates F-functions 221 and 222 which have the same input data line (x) and output data line (y) and which are arranged vertically adjacent to each other.

Four S-boxes included in the former F-function 221 are arranged in the order S1, S2, S1, and S2 from the top down, and S-boxes included in the latter F-function 222 in the next round are arranged in the order S2, S1, S2, and S1 from the top down.

Note that $S1 \neq S2$.

With such a setting, if the configuration capable of executing two S1's and two S2's in parallel to one another is implemented, the F-functions 221 and 222 can be executed using that configuration. Accordingly, the implementation cost can be reduced, and an apparatus can be made more compact.

Also in the configuration illustrated in FIG. 12, non-linear transformation processing applied to respective bit strings in the individual F-functions 221 and 222 is in the following order:

from S1 to S2, or from S2 to S1, and the processing of the respective bit data (e.g., each byte unit) is processing similar to that described with reference to FIG. 10. As a result, a similar effect can be achieved, that is, the probability of data appearing on an output line to collide with that appearing on the same output line prior to executing a round function can be greatly reduced. As a result, the difficulty of saturation attacks can be greatly increased, and the immunity against attacks can be enhanced.

Figure 13:
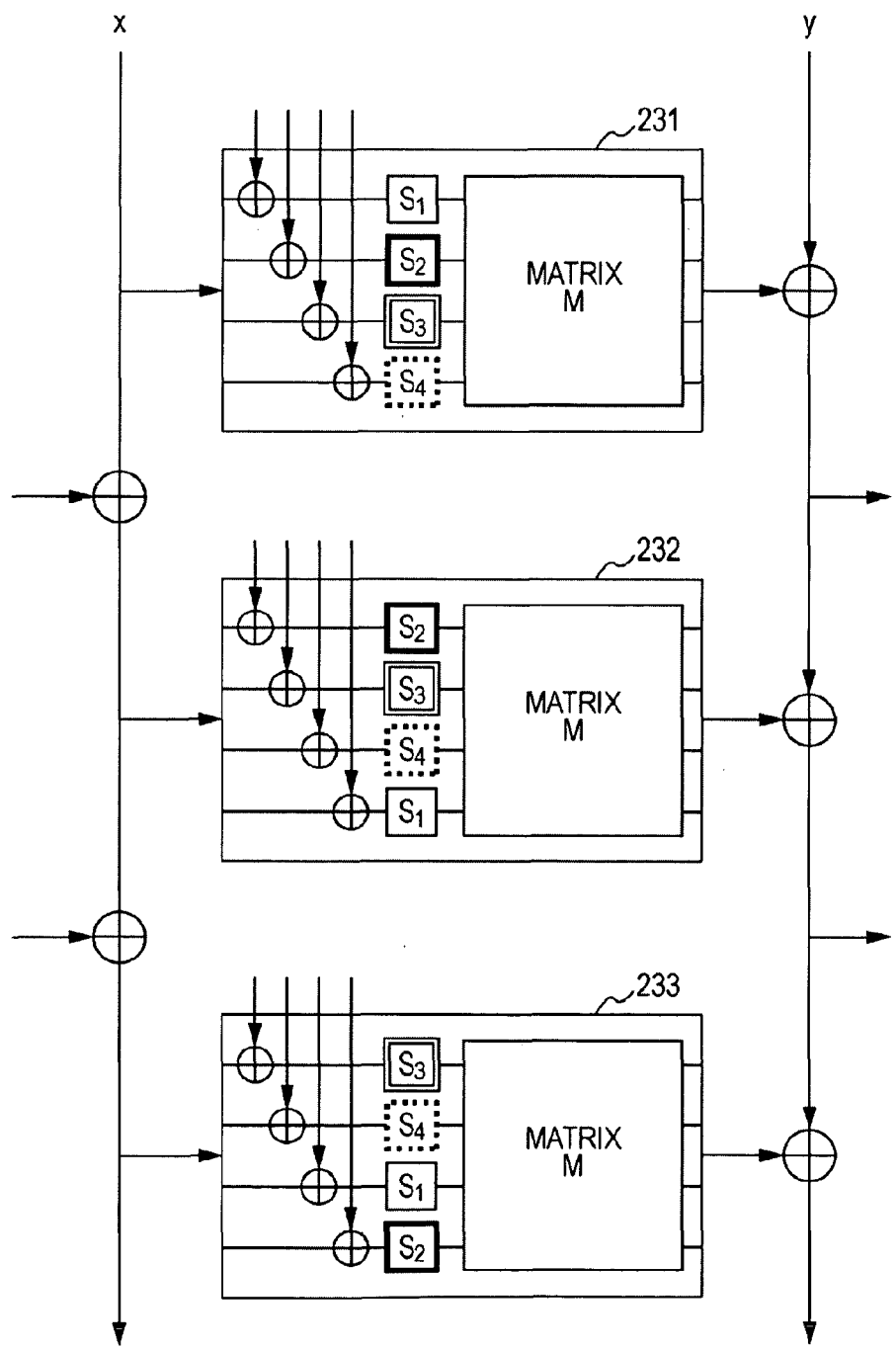
FIG. 13 is a diagram describing a configuration example in which different S-boxes are arranged to enhance the immunity against saturation attacks.

Another specific example is illustrated in FIG. 13. As in FIG. 11, FIG. 13 illustrates the configuration of a cut-out portion of a Feistel structure or a generalized Feistel structure. FIG. 13 illustrates three F-functions 231 to 233 which have the same input data line (x) and output data line (y) and which are vertically adjacent to one another.

Four S-boxes included in the beginning F-function 231 are arranged in the order S1, S2, S3, and S4 from the top down. Four S-boxes included in the middle F-function 232 in the next round are arranged in the order S2, S3, S4, and S1 from the top down. Further, four S-boxes included in the middle F-function 233 in the next round are arranged in the order S3, S4, S1, and S2 from the top down.

Note that S1≠S2≠S3≠S4.

With such a setting, if the configuration capable of executing S1 to S4 in parallel to one another is implemented, all the F-functions 231 and 233 can be executed using that configuration. Accordingly, the implementation cost can be reduced, and an apparatus can be made more compact.

Also in the configuration illustrated in FIG. 13, non-linear transformation processing applied to respective bit strings in the individual F-functions 231 to 233 is in the following order:

S1, S2, S3, S4, S1, S2, ..., and the processing of the respective bit data (e.g., each byte unit) is processing similar to that described with reference to FIG. 10 or FIG. 11. As a result, a similar effect can be achieved, that is, the probability of data appearing on an output line to collide with that appearing on the same output line prior to executing a round function can be greatly reduced. As a result, the difficulty of saturation attacks can be greatly increased, and the immunity against attacks can be enhanced.

(2B) Configuration in which Immunity Against Algebraic Attacks (XSL Attacks) is Enhanced by Mixing Two or More Different Types of S-Boxes in Blockcipher Using S-Boxes Next, the configuration in which immunity against algebraic attacks (XSL attacks) is enhanced by mixing different types of S-boxes in a blockcipher using S-boxes will be described.

(2B-1) Outline of Algebraic Attacks (XSL Attacks)

Firstly, algebraic attacks (XSL attacks) which are known as attacks on blockciphers will be described. Algebraic attacks (XSL attacks) on blockciphers are attacks employing algebraic representations of S-boxes. When inputs and outputs of S-boxes are represented as algebraic expressions, a plurality of expressions can be derived. The computational complexity for making an attack changes depending on the maximum order of the expressions and the number of terms included in the expressions.

As one example of an algebraic attack (XSL attack), there is a method using Boolean expressions. For example, given a blockcipher including a plurality of S-boxes each taking an 8-bit input and producing an 8-bit output, and let input bits and output bits of each 8-bit-input/output S-box be expressed as follows:

input X: (x1, x2, x3, x4, x5, x6, x7, x8), and output Y: (y1, y2, y3, y4, y5, y6, y7, y8), then, the number of expressions that are expressed using quadratic or lower-order Boolean expressions is evaluated.

More specifically speaking, the number of polynomials including quadratic or lower-order terms, such as (1, xi, yi, xixj, yiyj, xiyj), which is yielded by expressing the above-described input X and output Y as Boolean expressions, is evaluated.

In the case where low-order expressions, such as those in which the maximum order is the second order, are taken out from all the Boolean expressions represented in this manner, if a greater number of independent expressions are taken out and if the number of terms is small, the situation is advantages for the attacker. That is, if a greater number of independent expressions in which the maximum order is limited to the second order or the like are taken out and if the number of terms is small, the situation is advantages for the attacker and shows poor immunity against attacks.

Further, besides Boolean expressions, if low-order algebraic representations can be derived over a field of definition, such as the extension field $GF(2^8)$, a similar technique can be employed to easily make an algebraic attack (XSL attack), which means that the immunity against attacks is poor.

(2B-2) Problem of Using S-Boxes of One Type

Next, the problem of the configuration in which S-boxes of only one type are used in a blockcipher using S-boxes, that is, the problem that the feasibility of an algebraic attack (XSL attack) is increased, will be described.

There are the following three representative types of s-bit S-boxes that perform non-linear transformation taking an n-bit input and producing an n-bit output:

type 1: an S-box using an inverse map: $Y=X^{-1}$ or a power function $Y=X^p$ over an extension field $GF(2^s)$;

type 2: an S-box generated by combining a plurality of S-boxes whose input and output bits are less than s bits, such as four bits; and type 3: an S-box selected at random.

These three types are representative.

In particular, type 1 and type 2 are S-boxes that are frequently used due to low hardware (H/W) implementation cost.

Hereinafter, for each of the above-described types 1 to 3, the problem of the configuration in which S-boxes of only one type are used, that is, the problem that the feasibility of an algebraic attack (XSL attack) is increased, will be described.

<Problem of Type 1>

The problem of type 1, that is, the problem of an S-box using an inverse map: $Y=X^{-1}$ or a power function $Y=X^p$ on $GF(2^s)$, will be described.

For example, in the case where an S-box using an inverse map over $GF(2^8)$ is represented as Boolean expressions, it is known that the representation includes twenty or so independent quadratic expressions and eighty or so terms. A similar simple relation can be found in the case of a power function. Also, a similar relation is expected to be valid for S-boxes defined not only over $GF(2^8)$, but also over $GF(2^s)$.

Using these polynomial representations, the computational complexity of an algebraic attack (XSL attack) can be estimated. At the time a cipher is designed, it is necessary to use a sufficient number of S-boxes in order to have sufficiently high computational complexity for ensuring security. Further, for an S-box using an inverse map over $GF(2^s)$, an algebraic representation such as $XY=1$ over $GF(2^s)$ can be yielded, and low-order polynomials can be derived. It is known that there are attacking methods using these characteristics. A similar result may be applicable to a power function.

Since two types of algebraic characteristics are used in a cipher using S-boxes using an inverse map or a power function over $GF(2^s)$, the cipher design should take these two types of algebraic characteristics into consideration.

Note that the same applies to S-boxes generated by adding affine transformation before/after the inverse map and the power function.

<Problem of Type 2>

Next, the problem of type 2, that is, the problem of an S-box generated by combining a plurality of smaller (e.g., 4-bit) S-boxes, will be described.

Consider an 8-bit S-box generated by combining a plurality of small S-boxes each taking, for example, a 4-bit input and producing a 4-bit output. It is known that an 8-bit S-box can be configured using three to five 4-bit S-boxes. To make an algebraic attack (XSL attack), quadratic or lower-order Boolean polynomials are derived from the input and output bits of the 4-bit S-boxes. Since the sum of the input and output bits is eight, it is known that there are about twenty or so independent expressions represented by such low-order polynomials. Therefore, using this characteristic, an attack can be made. This tendency applies to the case where, in order to make an S-box with a larger input/output size, the larger S-box is configured using smaller S-boxes.

However, as advantages of this method, because the probability of a simple algebraic relation existing over a field of $GF(2^s)$, such as in the case of using S-boxes using an inverse map on $GF(2^8)$, is significantly reduced, it is known that the computational complexity for making an attack is increased. This means that, compared with the former S-boxes, there are both advantages and disadvantages in terms of algebraic attacks (XSL attacks).

<Problem of Type 3>

Next, the problem of type 3, that is, the problem of an S-box selected at random, will be described. It is expected that S-boxes selected at random do not have algebraically weak characteristics as has been described above, and hence these S-boxes are expected to provide high security against algebraic attacks (XSL attacks). However, the H/W implementation cost is very high. It is therefore not preferable to have all the S-boxes to be S-boxes selected at random.

(2B-3) Configuration in which Immunity is Enhanced by Using Plural Types of S-Boxes Having Different Algebraic Characteristics In view of the above-described problems, a description will be given below of the configuration in which the immunity against both algebraic attacks (XSL attacks) using Boolean polynomials and algebraic attacks (XSL attacks) using a field $GF(2^s)$ can be enhanced by using two or more types of S-boxes having different algebraic characteristics, and in which the hardware (H/W) implementation efficiency is enhanced even more than in the case where all the S-boxes are S-boxes selected at random.

As has been described above, there are the following three representative types of s-bit S-boxes that perform non-linear transformation taking an s-bit input and producing an s-bit output:

type 1: an S-box using an inverse map: $Y=X^{-1}$ or a power function $Y=X^p$ over an extension field $GF(2^s)$;

type 2: an S-box generated by combining a plurality of small t-bit S-boxes (where t<s); and type 3: an S-box selected at random.

These three types are representative.

In the present embodiment, the mixed use of these different types of S-boxes realizes the configuration in which the immunity against algebraic attacks (XSL attacks) is enhanced and the hardware (H/W) implementation efficiency is increased. That is, the mixed use of two or more different types of S-boxes in a blockcipher using S-boxes realizes the configuration in which the immunity against algebraic attacks (XSL attacks) is enhanced. Note that it is only necessary that an encryption processing configuration to which the present embodiment is applicable should be an encryption processing configuration having S-boxes that perform non-linear transformation processing. For example, the encryption processing configuration is applicable to any of the following encryption processing configurations, which have been described above, that is:

(a) SPN (Substitution Permutation Network) structure;

(b) Feistel structure; and (c) generalized Feistel structure.

In this processing example, S-boxes serving as non-linear transformation processing parts included in round functions for performing data transformation processing are any one of the following settings (a) to (d):

(a) a configuration in which some of the S-boxes are of type 1, and the remaining S-boxes are of type 2;

(b) a configuration in which some of the S-boxes are of type 1, and the remaining S-boxes are of type 3;

(c) a configuration in which some of the S-boxes are of type 2, and the remaining S-boxes are of type 3; and (d) a configuration in which some of the S-boxes are of type 1, some of the remaining S-boxes are of type 2, and the rest of the S-boxes are of type 3.

For example, in the case of the above-described setting (a), consider a theoretical cipher in which half of S-boxes serving as non-linear transformation processing parts included in round functions for performing data transformation processing are of type 1, that is, S-boxes using an inverse map over $GF(2^8)$, and the remaining S-boxes are excluded. The computational complexity of making an algebraic attack (XSL attack) using Boolean expressions on the theoretical cipher is estimated. If sufficient computational complexity is estimated, the remaining half of the S-boxes are configured as type 2, that is, 8-bit S-boxes generated by combining a plurality of small 4-bit S-boxes.

With the encryption processing configuration having a mixture of type 1 and type 2 as in the above-described (a), if sufficient immunity can be ensured on the basis of the estimation of the computational complexity over $GF(2^8)$, the blockcipher in which the overall immunity is enhanced can be generated, compared with the case in which S-boxes of each type are separately used.

This effect is not limited to the above-described setting. Similarly in any of the above-described (a) to (d), the encryption processing configuration is set such that even a limited number of S-boxes can provide sufficiently strong immunity against algebraic attacks (XSL attacks), and the remaining S-boxes can be determined taking into consideration the implementation efficiency or the like.

Referring to FIG. 14 through FIG. 18, specific examples of the encryption processing configuration including an arrangement of different types of S-boxes as in the above-described (a) to (d) will be described. The examples illustrated in FIG. 14 through FIG. 18 each show an encryption processing configuration having round-function executing parts in six rounds. Each round-function executing part includes a non-linear transformation processing part including a plurality of S-boxes and a linear transformation processing part.

Figure 14:
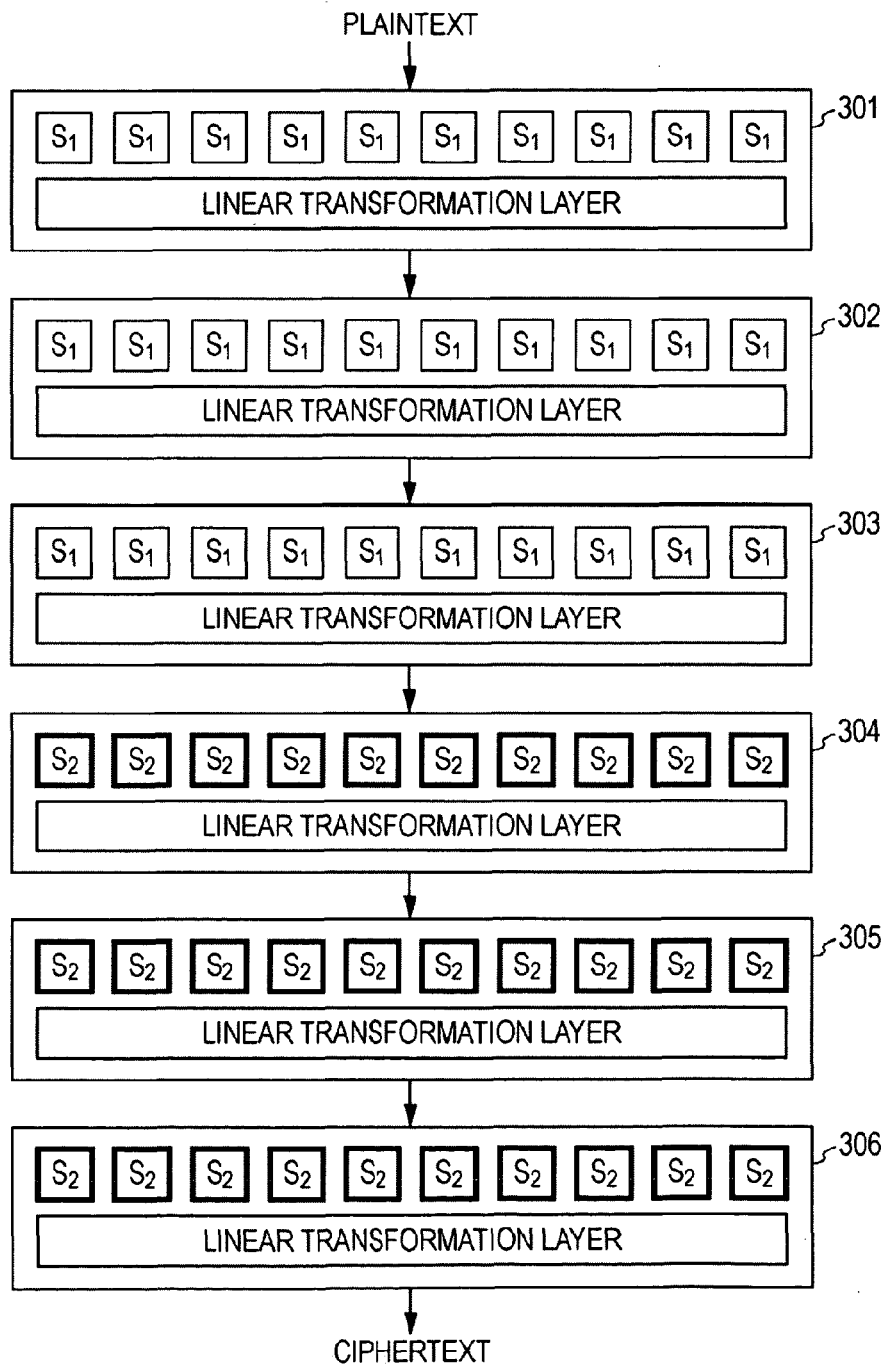
FIG. 14 is a diagram describing a configuration example in which different types of S-boxes are arranged to enhance the immunity against algebraic attacks (XSL attacks).

FIG. 14 illustrates an exemplary SPN blockcipher with six rounds, and each round includes ten S-boxes. The SPN blockcipher performs data transformation including a non-linear transformation layer (S layer) and a linear transformation layer (P layer) in each round. The ten S-boxes included in each round take respective pieces of input data into which input data is divided as inputs, perform non-linear transformation processing, and output pieces of non-linearly-transformed data to the linear transformation layer (P layer). Linearly-transformed data is output to the next round-function executing part. An output of the round-function executing part in the last stage is ciphertext.

In individual round-function executing parts 301 to 306 illustrated in the diagram, [$S_1$] and [$S_2$] denote type-1 S-box and type-2 S-box, respectively, which are S-boxes serving as different types of non-linear transformation processing parts as has been described above.

The example illustrated in FIG. 14 is a configuration example in which, type 1: an S-box using an inverse map: $Y=X^{-1}$ or a power function $Y=X^p$ over an extension field $GF(2^s)$, S-boxes of this type 1 are arranged in the round-function executing parts 301 to 303 in the former three rounds, and type 2: an S-box generated by combining a plurality of small S-boxes, such as 4-bit S boxes S-boxes of this type 2 are arranged in the round-function executing parts 301 to 303 in the latter three rounds.

In the configuration in FIG. 14, non-linear transformation processing in the former rounds is performed as processing applying type-1 S-boxes, and non-linear transformation processing in the latter rounds is performed as processing applying type-2 S-boxes. An algebraic attack (XSL attack) is generally made on the assumption that all the S-boxes are of the same type. In the case where different types of S-boxes are mixed in the foregoing manner, an attack, namely, analysis, becomes difficult. As a result, the encryption processing configuration with strong immunity against cryptanalysis such as algebraic attacks (XSL attacks) is realized.

Figure 15:
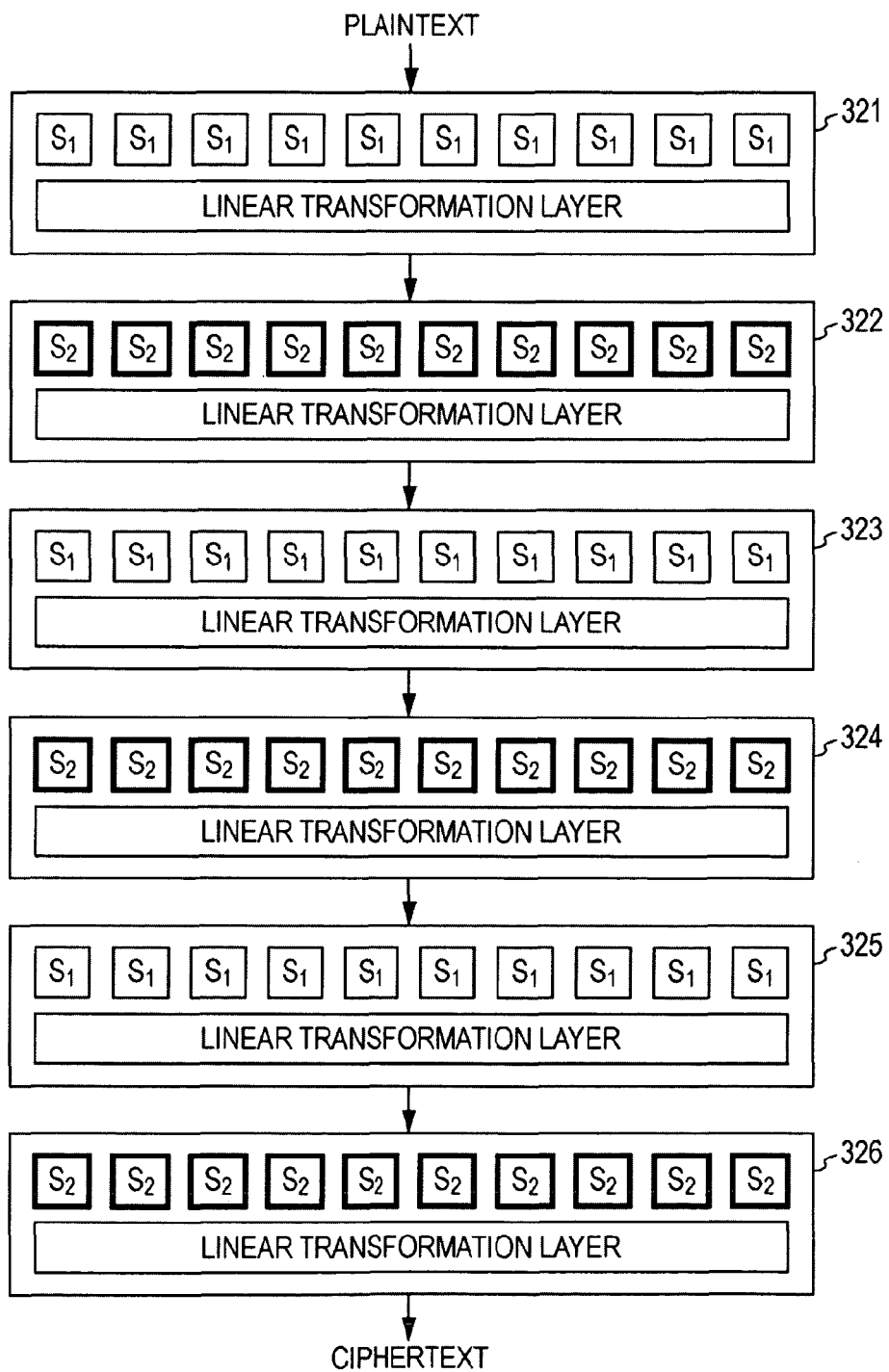
FIG. 15 is a diagram describing a configuration example in which different types of S-boxes are arranged to enhance the immunity against algebraic attacks (XSL attacks).

FIG. 15 illustrates an exemplary SPN blockcipher with six rounds, and each round includes ten S-boxes, as in FIG. 14.

The example illustrated in FIG. 15 is a configuration example in which, type 1: an S-box using an inverse map: $Y=X^{-1}$ or a power function $Y=X^p$ over an extension field $GF(2^s)$, S-boxes of this type 1 are arranged in round-function executing parts 321, 323, and 325 in the first, third, and fifth or odd-numbered rounds, and type 2: an S-box generated by combining a plurality of small S-boxes, such as 4-bit S boxes S-boxes of this type 2 are arranged in round-function executing parts 322, 324, and 326 in the second, fourth, and sixth or even-numbered rounds.

In the configuration illustrated in FIG. 15, non-linear transformation processing in the odd-numbered rounds is performed as processing applying type-1 S-boxes, and non-linear transformation processing in the even-numbered rounds is performed as processing applying type-2 S-boxes. As is the configuration in FIG. 14, a mixture of different types of S-boxes is set in the present configuration. Accordingly, the encryption processing configuration with strong immunity against cryptanalysis such as algebraic attacks (XSL attacks) is realized.

Figure 16:
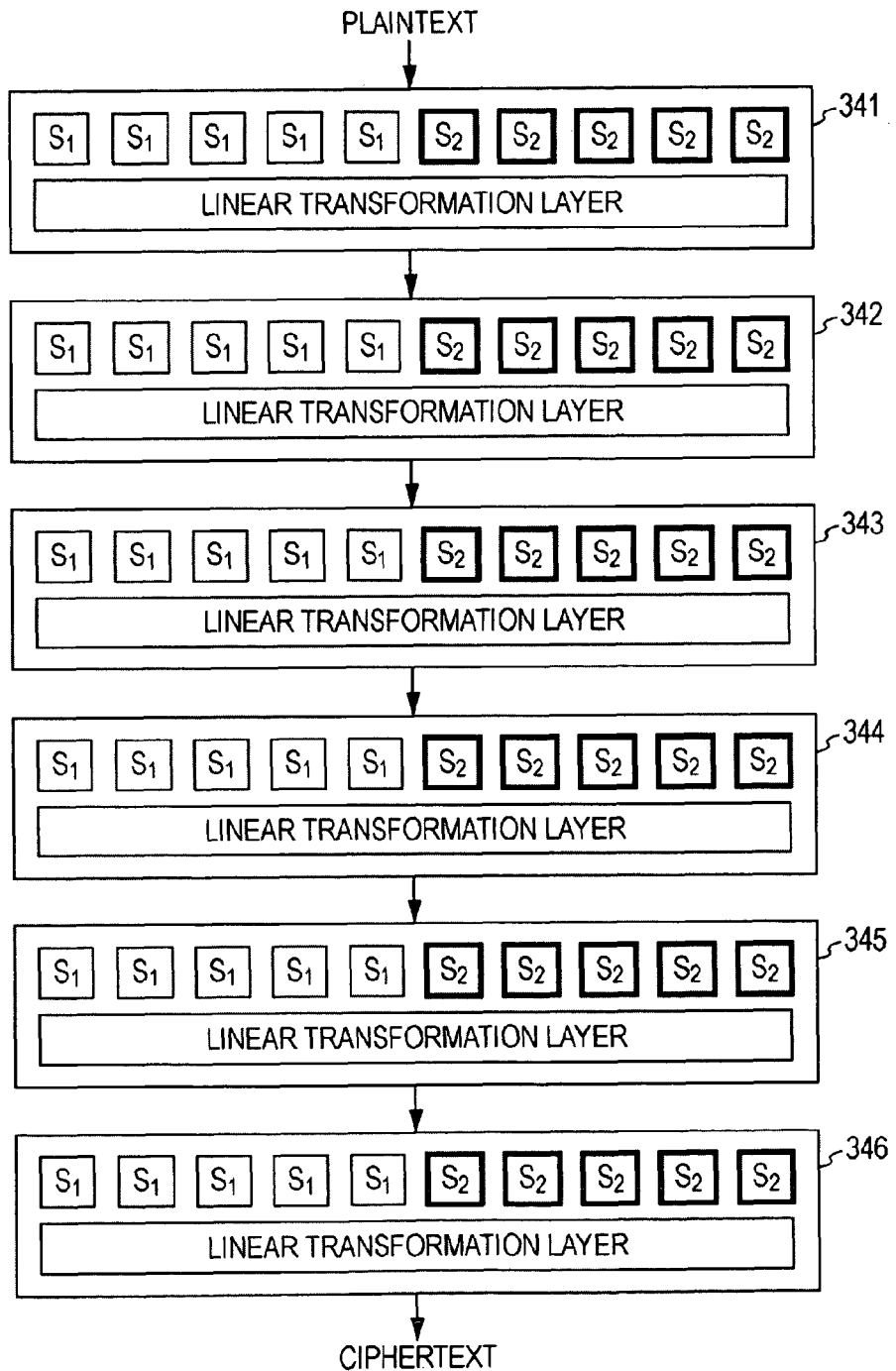
FIG. 16 is a diagram describing a configuration example in which different types of S-boxes are arranged to enhance the immunity against algebraic attacks (XSL attacks).

FIG. 16 illustrates an exemplary SPN blockcipher with six rounds, and each round includes ten S-boxes, as in FIG. 14 and FIG. 15.

The example illustrated in FIG. 16 is a configuration example in which type 1: an S-box using an inverse map: $Y=X^{-1}$ or a power function $Y=X^p$ over an extension field $GF(2^s)$, S-boxes of this type 1 are arranged as half of S-boxes in round-function executing parts 341 to 346 in all the rounds, and type 2: an S-box generated by combining a plurality of small S-boxes, such as 4-bit S boxes S-boxes of this type 2 are arranged as the remaining half of the S-boxes. That is, five type-1 S-boxes $[S_1]$ and five type-2 S-boxes $[S_2]$ are included in each of the round-function executing parts 341 to 346.

Data input to each of the round-function executing parts 341 to 346 is divided into ten equal pieces, and the ten pieces are input to the respective S-boxes. Of ten equal pieces $d_1$ to $d_{10}$ of the data, the first half of the pieces of data $d_1$ to $d_5$ are input to the type-1 S-boxes, and non-linear transformation processing applying the type-1 S-boxes is performed; and the second half of the pieces of data $d_6$ to $d_{10}$ are input to the type-2 S-boxes, and non-linear transformation processing applying the type-2 S-boxes is performed.

As is the configuration in FIG. 14 and FIG. 15, a mixture of different types of S-boxes is also set in the configuration in FIG. 16. Accordingly, the encryption processing configuration with strong immunity against cryptanalysis such as algebraic attacks (XSL attacks) is realized.

Figure 17:
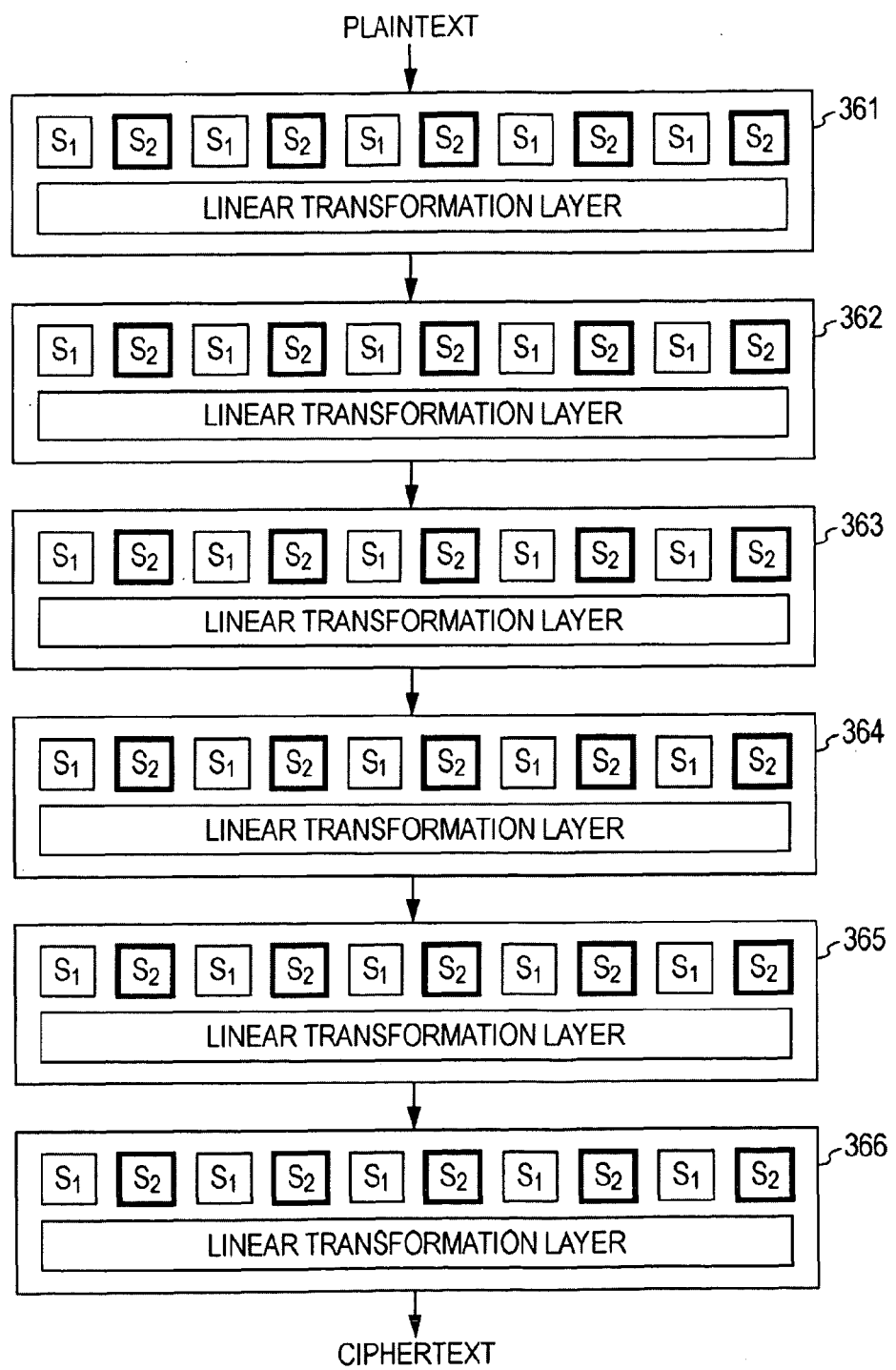
FIG. 17 is a diagram describing a configuration example in which different types of S-boxes are arranged to enhance the immunity against algebraic attacks (XSL attacks).

FIG. 17 illustrates an exemplary SPN blockcipher with six rounds, and each round includes ten S-boxes, as in FIG. 14 through FIG. 16.

As in the example illustrated in FIG. 16, the example illustrated in FIG. 17 is a configuration example in which, type 1: an S-box using an inverse map: $Y=X^{-1}$ or a power function $Y=X^p$ over an extension field $GF(2^s)$, S-boxes of this type 1 are arranged as half of S-boxes in round-function executing parts 361 to 366 in all the rounds, and type 2: an S-box generated by combining a plurality of small S-boxes, such as 4-bit S boxes S-boxes of this type 2 are arranged as the remaining half of the S-boxes. That is, five type-1 S-boxes $[S_1]$ and five type-2 S-boxes $[S_2]$ are included in each of the round-function executing parts 361 to 366.

Data input to each of the round-function executing parts 361 to 366 is divided into ten equal pieces, and the ten pieces are input to the respective S-boxes. Of ten equal pieces $d_1$ to $d_{10}$ of the data, the odd-numbered pieces of data $d_1$, $d_3$, $d_5$, $d_7$, and $d_9$ are input to the type-1 S-boxes, and non-linear transformation processing applying the type-1 S-boxes is performed; and the even-numbered pieces of data $d_2$, $d_4$, $d_6$, $d_8$, and $d_{10}$ are input to the type-2 S-boxes, and non-linear transformation processing applying the type-2 S-boxes is performed.

As is the configuration in FIG. 14 through FIG. 16, a mixture of different types of S-boxes is also set in the configuration in FIG. 17. Accordingly, the encryption processing configuration with strong immunity against cryptanalysis such as algebraic attacks (XSL attacks) is realized.

In the configurations illustrated in FIG. 16 and FIG. 17, S-boxes to be executed in parallel to one another in each round include five type-1 S-boxes and five type-2 S-boxes. This is common to all the rounds. Therefore, if the configuration capable of executing five type-1 S-boxes and five type-2 S-boxes in parallel to one another is implemented, this configuration can be repeatedly applied to execute round functions in all the rounds, resulting in an advantage that the implementation cost and size can be reduced.

Figure 18:
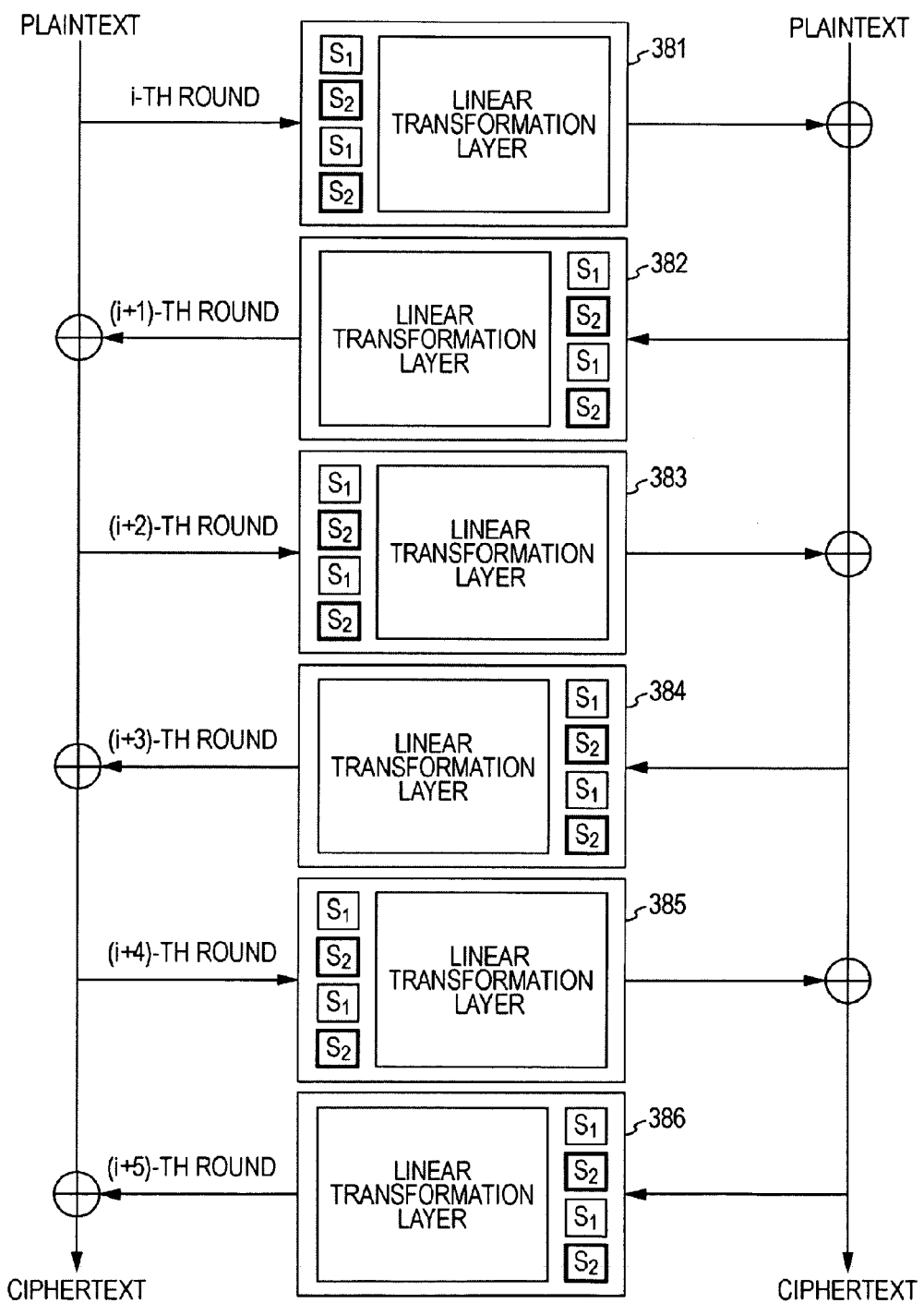
FIG. 18 is a diagram describing a configuration example in which different types of S-boxes are arranged to enhance the immunity against algebraic attacks (XSL attacks).

An example in which different types of S-boxes are arranged in individual round-function executing parts 381 to 386 in a Feistel structure is illustrated in FIG. 18.

The example illustrated in FIG. 18 is a configuration example in which, type 1: an S-box using an inverse map: $Y=X^{-1}$ or a power function $Y=X^p$ over an extension field $GF(2^s)$, S-boxes of this type 1 are arranged as half of the S-boxes in the round-function executing parts 381 to 386 in all the rounds, and type 2: an S-box generated by combining a plurality of small S-boxes, such as 4-bit S boxes S-boxes of this type 2 are arranged as the remaining half of the S-boxes. That is, two type-1 S-boxes $[S_1]$ and two type-2 S-boxes $[S_2]$ are included in each of the round-function executing parts 381 to 386.

Data input to each of the round-function executing parts 381 to 386 is divided into four equal pieces, and the four pieces are input to the respective S-boxes. Of four equal pieces $d_1$ to $d_4$ of the data, the odd-numbered pieces of data $d_1$ and $d_3$ are input to the type-1 S-boxes, and non-linear transformation processing applying the type-1 S-boxes is performed; and the even-numbered pieces of data $d_2$ and $d_4$ are input to the type-2 S-boxes, and non-linear transformation processing applying the type-2 S-boxes is performed.

As is the configuration in FIG. 14 through FIG. 17, a mixture of different types of S-boxes is also set in the configuration in FIG. 18. Accordingly, the encryption processing configuration with strong immunity against cryptanalysis such as algebraic attacks (XSL attacks) is realized.

Note that, in the examples illustrated in FIG. 14 through FIG. 18, the configuration examples using a mixture of two different types of S-boxes, S-boxes of type 1 and type 2, have been illustrated. As configurations with mixtures of different types of S-boxes, configurations with the following various types of mixtures are possible, as has been described above:

(a) a configuration in which some of the S-boxes are of type 1, and the remaining S-boxes are of type 2;

(b) a configuration in which some of the S-boxes are of type 1, and the remaining S-boxes are of type 3;

(c) a configuration in which some of the S-boxes are of type 2, and the remaining S-boxes are of type 3; and (d) a configuration in which some of the S-boxes are of type 1, some of the remaining S-boxes are of type 2, and the rest of the S-boxes are of type 3.

In any case, enhancement of the immunity against algebraic attacks (XSL attacks) is realized.

(2C) Configuration in which the Above-Described (2A) and (2B) are Simultaneously Realized in Feistel Cipher or Generalized Feistel-Type Cipher Using S-Boxes Next, a description will now be given of a configuration example for simultaneously realizing the above-described (2A) and (2B) in a Feistel cipher or a generalized Feistel cipher using S-boxes, that is:

(2A) Configuration in which immunity against saturation attacks is enhanced by arranging two or more different types of S-boxes in Feistel or generalized Feistel-type cipher using S-boxes; and (2B) Configuration in which immunity against algebraic attacks (XSL attacks) is enhanced by mixing two or more different types of S-boxes in blockcipher using S-boxes.

The configuration in the above-described (2A) is configured to enhance the immunity against saturation attacks by applying two or more types of S-boxes in a Feistel structure or a generalized Feistel structure. The configuration in the above-described (2B) is configured to enhance the immunity against algebraic attacks (XSL attacks) by using two or more types of S-boxes in any blockcipher using S-boxes.

These configurations in (2A) and (2B) can be combined and realized as one configuration. That is, it is possible to configure a blockcipher having a Feistel or generalized Feistel structure using two or more types of S-boxes satisfying the characteristics necessary in (2A) and (2B), thereby simultaneously enhancing the immunity against both types of attacks.

Specifically, for each of S-boxes [S1], [S2], [S3], [S4], . . . that perform different types of non-linear transformation processing applied in each of the configurations in FIG. 10 through FIG. 13 described in (2A) Configuration in which immunity against saturation attacks is enhanced by arranging two or more different types of S-boxes in Feistel or generalized Feistel-type cipher using S-boxes, different types of S-boxes described in (2B) Configuration in which immunity against algebraic attacks (XSL attacks) is enhanced by mixing two or more different types of S-boxes in blockcipher using S-boxes, that is, type 1: an S-box using an inverse map: $Y=X^{-1}$ or a power function $Y=X^p$ over an extension field $GF(2^s)$;

type 2: an S-box generated by combining a plurality of small S-boxes, such as 4-bit S boxes; and type 3: an S-box selected at random, these three types are set in association.

For example, in the configuration illustrated in FIG. 10, by setting the S-boxes [S1] and the S-boxes [S2] as different types of S-boxes described in (2B), the configuration with strong immunity against saturation attacks and algebraic attacks (XSL attacks) is realized.

The same applies to the configurations illustrated in FIG. 11 through FIG. 13.

By setting the S-boxes [S1], [S2], . . . as different types of S-boxes described in (2B), the configuration with strong immunity against saturation attacks and algebraic attacks (XSL attacks) is realized.

[3. Configuration Example of Encryption Processing Apparatus]

Figure 19:
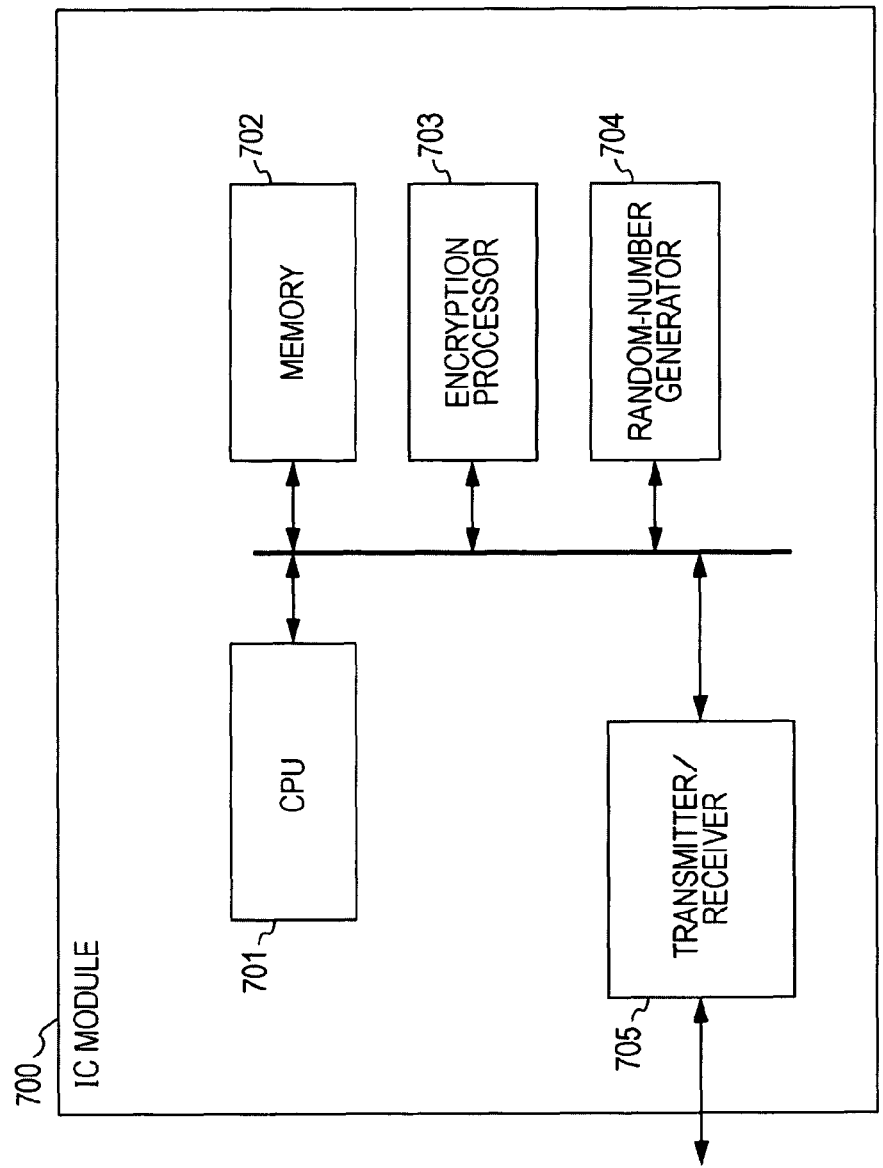
FIG. 19 is a diagram describing a configuration example of an IC module serving as an encryption processing apparatus that performs encryption processing according to the present invention.

Finally, a configuration example of an IC module 700 serving as an encryption processing apparatus that performs encryption processing in accordance with the above-described embodiments is illustrated in FIG. 19. The above-described processing can be performed by various information processing apparatuses, such as a PC, an IC card, a reader-writer, and the like. The IC module 700 illustrated in FIG. 19 can be configured in any of these devices.

A CPU (Central processing Unit) 701 illustrated in FIG. 19 is a processor that controls start and stop of encryption processing, transmission/reception of data, and transfer of data among individual elements, and executes various other programs. A memory 702 includes, for example, a ROM (Read-Only-Memory) storing a program executed by the CPU 701 or fixed data such as operation parameters, and a RAM (Random Access Memory) used as a storage area or a work area for a program executed in the processing performed by the CPU 701 and parameters changing as needed in the program processing. In addition, the memory 702 can be used as a storage area for, for example, key data necessary for encryption processing, a transformation table (permutation table) applied to encryption processing, and data applied to a transformation matrix. Note that the data storage area is preferably configured as a memory with a tamper-resistant structure.

An encryption processor 703 performs encryption processing and decryption processing in accordance with a common-key blockcipher processing algorithm applying one of the following structures with the respective configurations, i.e., for example, the above-described various encryption processing configurations:

(a) SPN (Substitution Permutation Network) structure;
(b) Feistel structure; and
(c) Generalized Feistel structure.

In addition, the encryption processor 703 includes S-boxes serving as non-linear transformation processing parts having the configurations corresponding to the above-described embodiments, that is, a configuration corresponding to any one of the following configurations:

(2A) Configuration in which two or more different types of S-boxes are arranged in Feistel or generalized Feistel-type cipher using S-boxes;

(2B) Configuration in which two or more different types of S-boxes are mixed in blockcipher using S-boxes; and (2C) Configuration in which the above-described (2A) and (2B) are simultaneously realized in Feistel cipher or generalized Feistel-type cipher using S-boxes.

Note that, although the example in which the encryption processing means is a separate module has been described above, instead of providing such an independent encryption processing module, for example, an encryption processing program may be stored in a ROM, and the CPU 701 may be configured to read and execute the program stored on the ROM.

A random-number generator 704 performs generation processing of random numbers which are necessary for, for example, generating keys necessary for encryption processing.

A transmitter/receiver 705 is a data communication processor that performs data communication with the outside. For example, the transmitter/receiver 705 performs data communication with an IC module, such as a reader/writer, and performs outputting of ciphertext generated in the IC module or taking data from a device such as an external reader/writer as an input.

The IC module 700 has an arrangement of S-boxes serving as non-linear transformation processing parts in accordance with the above-described embodiments. As a result, the IC module 700 has one of these configurations:

(2A) Configuration in which immunity against saturation attacks is enhanced by arranging two or more different types of S-boxes in Feistel or generalized Feistel-type cipher using S-boxes;

(2B) Configuration in which immunity against algebraic attacks (XSL attacks) is enhanced by mixing two or more different types of S-boxes in blockcipher using S-boxes; and (2C) Configuration in which the above-described (2A) and (2B) are simultaneously realized in Feistel cipher or generalized Feistel-type cipher using S-boxes.

Accordingly, the IC module 700 has the configuration in which immunity against saturation attacks and algebraic attacks (XSL attacks) is enhanced.

The present invention has been described in detail hereinabove with reference to the specific embodiments. It is to be understood, however, that modifications of or alternatives to the embodiments can be made by those skilled in the art without departing from the scope of the present invention. That is, the present invention has been disclosed by way of examples, and the disclosure should not be construed as restrictive. Reference shall be made to the appended claims for determining the scope of the present invention.

Note that the series of processes described in the specification can be executed by hardware, software, or a combination of both. In the case where the series of processes is performed by software, a program recording the processing sequence may be installed in a memory in a computer embedded in dedicated hardware and executed. Alternatively, the program may be installed on a general-purpose computer capable of performing various processes and executed.

For example, the program may be recorded in advance in a hard disk or a ROM (Read Only Memory) serving as a recording medium. Alternatively, the program may be stored (recorded) temporarily or permanently on a removable recording medium such as a flexible disc, a CD-ROM (Compact Disc Read Only Memory), an MO (Magneto optical) disc, a DVD (Digital Versatile Disc), a magnetic disc, or a semiconductor memory. Such removable recording media can be provided as so-called package software.

Note that, besides installing the program from the above-described removable recording medium to a computer, the program may be transferred wirelessly from a download site to a computer, or transferred by wire to a computer via a network such as a LAN (Local Area Network) or the Internet, allowing the computer to receive the program transferred in the foregoing manner and install the program on an internal recording medium such as a hard disk.

Note that the various processes described in the specification are not necessarily performed sequentially in the orders described, and may be performed in parallel or individually in accordance with the processing performance or need of an apparatus that performs the processes. In addition, a system in the present specification refers to a logical assembly of a plurality of apparatuses and is not limited to an assembly in which apparatuses having individual configurations are contained in a single housing.

INDUSTRIAL APPLICABILITY

As has been described above, according to the configuration of an embodiment of the present invention, in an encryption processing apparatus that performs common-key block-cipher processing, S-boxes serving as non-linear transformation processing parts set in round-function executing parts are configured as at least two different types of S-boxes. With this configuration, the immunity against saturation attacks can be enhanced. In addition, according to the configuration of an embodiment of the present invention in which types of S-boxes present a mixture of different types, the immunity against algebraic attacks (XSL attacks) can be enhanced, thereby realizing a highly secure encryption processing apparatus.

The invention claimed is:

1. An encryption processing apparatus comprising:
    an encryption processor that performs data transformation processing using a plurality of F-function including S-boxes as a round function on individual data lines obtained by dividing input data by a number greater than or equal to three,
    wherein the encryption processor is configured to include different types of S-boxes in the plurality of F-functions that have the same input data line and output data line and that are vertically adjacent to one another, the different types of S-boxes in the plurality of F-functions having the same bit configuration, the data input to each of the plurality of F-functions being the result of an exclusive-OR operation on the data input to a previous F-function;
    wherein the encryption processor is further configured to perform non-linear transformation processing, using at least two different s-bit input/output types of S-boxes, wherein the at least two different types of S-boxes are:
    (1) type 1: an S-box using an inverse map: $Y=X^{-1}$ or a power function $Y=X^q$ over an extension field $GF(2^s)$;
    (2) type 2: an S-box generated by combining a plurality of small t-bit S-boxes, where $t<s$; and
    (3) type 3: an S-box selected at random.

2. The encryption processing apparatus according to claim 1, wherein:
    the encryption processor is configured to perform encryption processing applying a Feistel structure in which the number of data lines is two, or a generalized Feistel structure in which the number of data lines is two or greater, and
    the encryption processor is configured to perform encryption processing applying F-functions serving as round-function executing parts, which have the same input data line and output data line and which are vertically adjacent to one another, in which non-linear transformation processing performed in the F-functions is set as different S-boxes that perform different types of non-linear transformation processing.

3. The encryption processing apparatus according to claim 2, wherein each of the F-functions serving as the round-function executing parts includes a plurality of S-boxes that perform non-linear transformation processing of respective pieces of data into which data to be processed is divided, and the plurality of S-boxes include at least two different types of S-boxes.

4. The encryption processing apparatus according to claim 2, wherein each of the F-functions serving as the round-function executing parts includes a plurality of S-boxes that perform non-linear transformation processing of respective pieces of data into which data to be processed is divided, and non-linear transformation processing performed in increments of a piece of data in the F-functions serving as the round-function executing parts, which have the same input data line and output data line and which are vertically adjacent to one another, is configured to be set as different S-boxes that perform different types of non-linear transformation processing.

5. The encryption processing apparatus according to claim 2, wherein the types of the S-boxes and the number of the individual S-boxes included in each of the F-functions serving as the round-function executing parts have the same setting among the individual F-functions.

6. The encryption processing apparatus according to claim 1, wherein the encryption processor has, regarding the S-boxes applied to executing the round function,
   (a) a configuration in which some of the S-boxes are of type 1, and the remaining S-boxes are of type 2;
   (b) a configuration in which some of the S-boxes are of type 1, and the remaining S-boxes are of type 3;
   (c) a configuration in which some of the S-boxes are of type 2, and the remaining S-boxes are of type 3; and
   (d) a configuration in which some of the S-boxes are of type 1, some of the remaining S-boxes are of type 2, and the rest of the S-boxes are of type 3, any one of the above-described configurations (a) to (d).

7. The encryption processing apparatus according to claim 1, wherein:
   the encryption processor includes, in round-function executing parts, a plurality of S-boxes that perform non-linear transformation processing of respective pieces of data into which data to be processed is divided, and
   the encryption processor is configured to perform processing using S-boxes of one type in one round and S-boxes of different types on a round-by-round basis.

8. The encryption processing apparatus according to claim 1, wherein: the encryption processor includes, in round-function executing parts, a plurality of S-boxes that perform non-linear transformation processing of respective pieces of data into which data to be processed is divided, and the encryption processing part is configured to use different types of S-boxes in one round.

9. The encryption processing apparatus according to claim 8, wherein the types of the S-boxes and the number of the individual S-boxes included in each of the round-function executing parts have the same setting among the individual F-functions.

10. The encryption processing apparatus according to any one of claims 1 to 9, wherein: the encryption processor is configured to perform encryption processing in accordance with common-key cryptography.

11. The encryption processing apparatus according to any one of claims 1 to 9, wherein: the encryption processor is configured to perform encryption processing in accordance with common-key blockcipher cryptography.

12. An encryption processing method of performing encryption processing in an encryption processing apparatus, the method comprising:
   an encryption processing step of performing, in an encryption processing part, data transformation processing using a plurality of F-functions including S-boxes as a round function on individual data lines obtained by dividing input data by a wherein the encryption processing step is configured to include different types of S-boxes in the plurality of F-functions that have the same input data line and output data line and that are vertically adjacent to one another, the different types of S-boxes in the plurality of F-functions having the same bit configuration, the data input to each of the plurality of F-functions being the result of an exclusive-OR operation on the data input to a previous F-function;

wherein the encryption processing step is further configured to perform non-linear transformation processing, using at least two different s-bit input/output types of S-boxes, wherein the at least two different types of S-boxes are:
   (1) type 1: an S-box using an inverse map: $Y=X^{-1}$ or a power function $Y=X^q$ over an extension field $GF(2^s)$;
   (2) type 2: an S-box generated by combining a plurality of small t-bit S-boxes, where $t<s$; and
   (3) type 3: an S-box selected at random.

13. The encryption processing method according to claim 12, wherein:
   the encryption processing step performs encryption processing in accordance with common-key cryptography or common-key blockcipher cryptography.

14. A non-transitory computer-readable medium encoded with a computer program that causes an encryption processing apparatus to perform encryption processing, the encryption processing comprising:
   an encryption processing step of performing, in an encryption processing part, data transformation processing using a plurality of F-functions including S-boxes as a round function on individual data lines obtained by dividing input data by a number greater than or equal to three,
   wherein the encryption processing step is a step of performing data transformation processing using different types of S-boxes in the plurality of F-functions that have the same input data line and output data line and that are vertically adjacent to one another, the different types of S-boxes in the plurality of F-functions having the same bit configuration, the data input to each of the plurality of F-functions being the result of an exclusive-OR operation on the data input to a previous F-function, and
   wherein the encryption processing step is further configured to perform non-linear transformation processing, using at least two different s-bit input/output types of S-boxes, wherein the at least two different types of S-boxes are:
   (1) type 1: an S-box using an inverse map: $Y=X^{-1}$ or a power function $Y=X^q$ over an extension field $GF(2^s)$;
   (2) type 2: an S-box generated by combining a plurality of small t-bit S-boxes, where $t<s$; and
   (3) type 3: an S-box selected at random.

15. The non-transitory computer-readable medium according to claim 14, wherein:
   the encryption processing step is a step of causing encryption processing to be performed in accordance with common-key cryptography or common-key blockcipher cryptography.

16. A decryption processing apparatus comprising:
   a decryption processor that performs data transformation processing using a plurality of F-functions including S-boxes as a round function on individual data lines obtained by dividing input data by a number greater than or equal to three,
   wherein the decryption processor is configured to include different types of S-boxes in the plurality of F-functions that have the same input data line and output data line and that are vertically adjacent to one another, the different types of S-boxes in the plurality of F-functions having the same bit configuration, the data input to each of the plurality of F-functions being the result of an exclusive-OR operation on the data input to a previous F-function, and wherein the decryption processor is further configured to perform non-linear transformation processing, using at least two different s-bit input/output types of S-boxes, wherein the at least two different types of S-boxes are:

(1) type 1: an S-box using an inverse map: $Y=X^{-1}$ or a power function $Y=X^q$ over an extension field $GF(2^s)$;

(2) type 2: an S-box generated by combining a plurality of small t-bit S-boxes, where t<s; and (3) type 3: an S-box selected at random.

17. The decryption processing apparatus according to claim 16, wherein:

the decryption processor is configured to perform decryption processing applying a Feistel structure in which the number of data lines is two, or a generalized Feistel structure in which the number of data lines is two or greater, and the decryption processor is configured to perform decryption processing applying F-functions serving as round-function executing parts, which have the same input data line and output data line and which are vertically adjacent to one another, in which non\-linear transformation processing performed in the F-functions is set as different S-boxes that perform different types of non-linear transformation processing.

18. The decryption processing apparatus according to claim 17, wherein each of the F-functions serving as the round-function executing parts includes a plurality of S-boxes that perform non-linear transformation processing of respective pieces of data into which data to be processed is divided, and the plurality of S-boxes include at least two different types of S-boxes.

19. The decryption processing apparatus according to claim 17, wherein each of the F-functions serving as the round-function executing parts includes a plurality of S-boxes that perform non-linear transformation processing of respective pieces of data into which data to be processed is divided, and non-linear transformation processing performed in increments of a piece of data in the F-functions serving as the round-function executing parts, which have the same input data line and output data line and which are vertically adjacent to one another, is configured to be set as different S-boxes that perform different types of non-linear transformation processing.

20. The decryption processing apparatus according to claim 17, wherein the types of the S-boxes and the number of the individual S-boxes included in each of the F-functions serving as the round-function executing parts have the same setting among the individual F-functions.

21. The decryption processing apparatus according to claim 16, wherein the decryption processor has, regarding the S-boxes applied to executing the round function, (a) a configuration in which some of the S-boxes are of type 1, and the remaining S-boxes are of type 2;

(b) a configuration in which some of the S-boxes are of type 1, and the remaining S-boxes are of type 3;

(c) a configuration in which some of the S-boxes are of type 2, and the remaining S-boxes are of type 3; and (d) a configuration in which some of the S-boxes are of type 1, some of the remaining S-boxes are of type 2, and the rest of the S-boxes are of type 3, any one of the above-described configurations (a) to (d).

22. The decryption processing apparatus according to claim 16, wherein:

the decryption processor includes, in round-function executing parts, a plurality of S-boxes that perform non-linear transformation processing of respective pieces of data into which data to be processed is divided, and the decryption processor is configured to perform processing using S-boxes of one type in one round and S-boxes of different types on a round-by-round basis.

23. The decryption processing apparatus according to claim 16, wherein: the decryption processor includes, in round-function executing parts, a plurality of S-boxes that perform non-linear transformation processing of respective pieces of data into which data to be processed is divided, and the decryption processing part is configured to use different types of S-boxes in one round.

24. The decryption processing apparatus according to claim 23, wherein the types of the S-boxes and the number of the individual S-boxes included in each of the round-function executing parts have the same setting among the individual F-functions.

25. The decryption processing apparatus according to any one of claims 16 to 24, wherein: the decryption processor is configured to perform decryption processing in accordance with common-key cryptography.

26. The decryption processing apparatus according to any one of claims 16 to 24, wherein: the decryption processor is configured to perform decryption processing in accordance with common-key blockcipher cryptography.

27. A decryption processing method of performing decryption processing in a decryption processing apparatus, the method comprising:

a decryption processing step of performing, in an encryption processing part, data transformation processing using a plurality of F-functions including S-boxes as a round function on individual data lines obtained by dividing input data by a number greater than or equal to three, wherein the decryption processing step is a step of performing data transformation processing using different types of S-boxes in the plurality of F-functions that have the same input data line and output data line and that are vertically adjacent to one another, the different types of S-boxes in the plurality of F-functions having the same bit configuration, the data input to each of the plurality of F-functions being the result of an exclusive-OR operation on the data input to a previous F-function, and wherein the decryption processing step is further configured to perform non-linear transformation processing, using at least two different s-bit input/output types of S-boxes, wherein the at least two different types of S-boxes are:

(1) type 1: an S-box using an inverse map: $Y=X^{-1}$ or a power function $Y=X^q$ over an extension field $GF(2^s)$;

(2) type 2: an S-box generated by combining a plurality of small t-bit S-boxes, where t<s; and (3) type 3: an S-box selected at random.

28. The decryption processing method according to claim 27, wherein:

the decryption processing step performs decryption processing in accordance with common-key cryptography or common-key blockcipher cryptography.

29. A non-transitory computer-readable medium encoded with a computer program that causes a decryption processing apparatus to perform decryption processing, the decryption processing comprising:
- a decryption processing step of performing, in an encryption processing part, data transformation processing using an F-function a plurality of F-functions including S-boxes as a round function on individual data lines obtained by dividing input data by a number greater than or equal to three,
- wherein the decryption processing step is a step of performing data transformation processing using different types of S-boxes in the plurality of F-functions that have the same input data line and output data line and that are vertically adjacent to one another, the different types of S-boxes in the plurality of F-functions having the same bit configuration, the data input to each of the plurality of F-functions being the result of an exclusive-OR operation on the data input to a previous F-function, and
- wherein the decryption processing step is further configured to perform non-linear transformation processing, using at least two different s-bit input/output types of S-boxes, wherein the at least two different types of S-boxes are:
  (1) type 1: an S-box using an inverse map: $Y=X^{-1}$ or a power function $Y=X^q$ over an extension field $GF(2^s)$;
  (2) type 2: an S-box generated by combining a plurality of small t-bit S-boxes, where t<s; and
  (3) type 3: an S-box selected at random.

30. The non-transitory computer-readable medium according to claim 29, wherein:
- the decryption processing step is a step of causing decryption processing to be performed in accordance with common-key cryptography or common-key blockcipher cryptography.

31. An information processing apparatus comprising:
- at least one processor,
- at least one memory device storing instructions that cause the apparatus to encrypt data by performing data transformation processing using a plurality of F-functions including S-boxes as a round function on individual data lines obtained by dividing input data by a number greater than or equal to three,
- wherein the apparatus is configured to include different types of S-boxes in the plurality of F-functions that have the same input data line and output data line and that are vertically adjacent to one another, the different types of S-boxes in the plurality of F-functions having the same bit configuration, the data input to each of the plurality of F-functions being the result of an exclusive-OR operation on the data input to a previous F-function, and
- wherein the apparatus is further configured to perform non-linear transformation processing, using at least two different s-bit input/output types of S-boxes, wherein the at least two different types of S-boxes are:
  (1) type 1: an S-box using an inverse map: $Y=X^{-1}$ or a power function $Y=X^q$ over an extension field $GF(2^s)$;
  (2) type 2: an S-box generated by combining a plurality of small t-bit S-boxes, where t<s; and
  (3) type 3: an S-box selected at random.

32. An information processing apparatus comprising:
- at least one processor,
- at least one memory device storing instructions that cause the apparatus to decrypt data by performing data transformation processing using a plurality of F-functions including S-boxes as a round function on individual data lines obtained by dividing input data by a number greater than or equal to three,
- wherein the apparatus is configured to include different types of S-boxes in the plurality of F-functions that have the same input data line and output data line and that are vertically adjacent to one another, the different types of S-boxes in the plurality of F-functions having the same bit configuration, the data input to each of the plurality of F-functions being the result of an exclusive-OR operation on the data input to a previous F-function, and
- wherein the apparatus is further configured to perform non-linear transformation processing, using at least two different s-bit input/output types of S-boxes, wherein the at least two different types of S-boxes are:
  (1) type 1: an S-box using an inverse map: $Y=X^{-1}$ or a power function $Y=X^q$ over an extension field $GF(2^s)$;
  (2) type 2: an S-box generated by combining a plurality of small t-bit S-boxes, where t<s; and
  (3) type 3: an S-box selected at random.

\* \* \* \* \*